US008339994B2

(12) United States Patent
Gnanasekaran et al.

(10) Patent No.: US 8,339,994 B2
(45) Date of Patent: Dec. 25, 2012

(54) DEFINING AN OPTIMAL TOPOLOGY FOR A GROUP OF LOGICAL SWITCHES

(75) Inventors: Sathish Kumar Gnanasekaran, San Jose, CA (US); Shashank R. Tadisina, San Jose, CA (US); Subramanian Lakshmanan, San Jose, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 703 days.

(21) Appl. No.: 12/549,271

(22) Filed: Aug. 27, 2009

(65) Prior Publication Data
US 2011/0051624 A1 Mar. 3, 2011

(51) Int. Cl.
*H04L 12/28* (2006.01)
*G06F 15/173* (2006.01)
*G06F 15/177* (2006.01)

(52) U.S. Cl. .......................... 370/254; 709/220; 709/242
(58) Field of Classification Search .................. None
See application file for complete search history.

(56) References Cited

U.S. PATENT DOCUMENTS

| | | | | |
|---|---|---|---|---|
| 6,333,918 | B1 * | 12/2001 | Hummel | 370/238 |
| 7,308,198 | B1 * | 12/2007 | Chudak et al. | 398/58 |
| 7,466,688 | B2 * | 12/2008 | Alicherry et al. | 370/351 |
| 7,617,320 | B2 * | 11/2009 | Alon et al. | 709/229 |
| 2002/0163889 | A1 * | 11/2002 | Yemini et al. | 370/238 |
| 2003/0189919 | A1 * | 10/2003 | Gupta et al. | 370/351 |
| 2003/0200295 | A1 * | 10/2003 | Roberts et al. | 709/223 |
| 2004/0215764 | A1 * | 10/2004 | Allen et al. | 709/224 |
| 2005/0251371 | A1 * | 11/2005 | Chagoly et al. | 703/1 |
| 2006/0031444 | A1 * | 2/2006 | Drew et al. | 709/223 |
| 2006/0193333 | A1 * | 8/2006 | Baughan et al. | 370/400 |
| 2007/0263590 | A1 * | 11/2007 | Abileah et al. | 370/351 |
| 2008/0183853 | A1 * | 7/2008 | Manion et al. | 709/223 |
| 2008/0225751 | A1 * | 9/2008 | Kozat et al. | 370/254 |
| 2008/0256323 | A1 * | 10/2008 | Mopur et al. | 711/173 |
| 2008/0301394 | A1 * | 12/2008 | Muppirala et al. | 711/170 |
| 2009/0238097 | A1 * | 9/2009 | Le Bars et al. | 370/254 |
| 2010/0157794 | A1 * | 6/2010 | Nakash | 370/228 |
| 2011/0029675 | A1 * | 2/2011 | Yeow et al. | 709/226 |

* cited by examiner

*Primary Examiner* — Timothy J Weidner
(74) *Attorney, Agent, or Firm* — Wong, Cabello, Lutsch, Rutherford & Brucculeri, LLP

(57) ABSTRACT

A Layer 2 network switch fabric is partitionable into a plurality of virtual fabrics. A network switch chassis is partitionable into a plurality of logical switches, each of which may be associated with one of the virtual fabrics, including a base switch. Logical switches in multiple network switch chassis are connected by logical connections, such as logical inter-switch links that use physical connections, such as extended inter-switch links between base switches, for data transport. A topology of logical connections is established that balances competing metrics, such as robustness and scalability, while maintaining alignment with the topology of the physical connections. A topology factor allows establishing different topologies with different balances between the competing metrics.

27 Claims, 18 Drawing Sheets

DEFINING AN OPTIMAL TOPOLOGY FOR A GROUP OF LOGICAL SWITCHES

TECHNICAL FIELD

The present invention relates to the field of network fabric virtualization and in particular to defining logical connectivity among a plurality of logical switches defined on a plurality of physical switches.

BACKGROUND ART

Switch-based network fabrics have been a major part of the development of storage area networks (SANs) in modern networking environments. Scalability of large Layer 2 (L2) fabrics has become a problem, as end users require ever-larger L2 fabrics, while also desiring consolidation of SAN islands and better tools for managing increasingly more complex SANs and other switch-based fabrics.

SUMMARY OF INVENTION

A Layer 2 network switch fabric is partitionable into a plurality of logical switches. Logical switches in multiple network switch chassis are connected by logical connections, such as logical inter-switch links, that use physical connections between physical switches, such as extended inter-switch links between base switches of their respective switch chassis, for data transport. Various embodiments provide techniques for determining a topology of logical connections among the logical switches. There are competing metrics for the topology, including robustness and scalability, which can result in different topologies. In addition, different switch operators may choose different balances between the competing metrics. Various embodiments provide for a topology factor that can vary the balance between some of the competing metrics, allowing variation in the creation of the topology of logical connections corresponding to the selected balance.

BRIEF DESCRIPTION OF DRAWINGS

The accompanying drawings, which are incorporated in and constitute a part of this specification, illustrate an implementation of apparatus and methods consistent with the present invention and, together with the detailed description, serve to explain advantages and principles consistent with the invention. In the drawings.

FIG. 10 is a disconnected graph of logical switches and logical inter-switch links corresponding to the base switches and inter-switch links of FIG. 9a;

Figure 1:
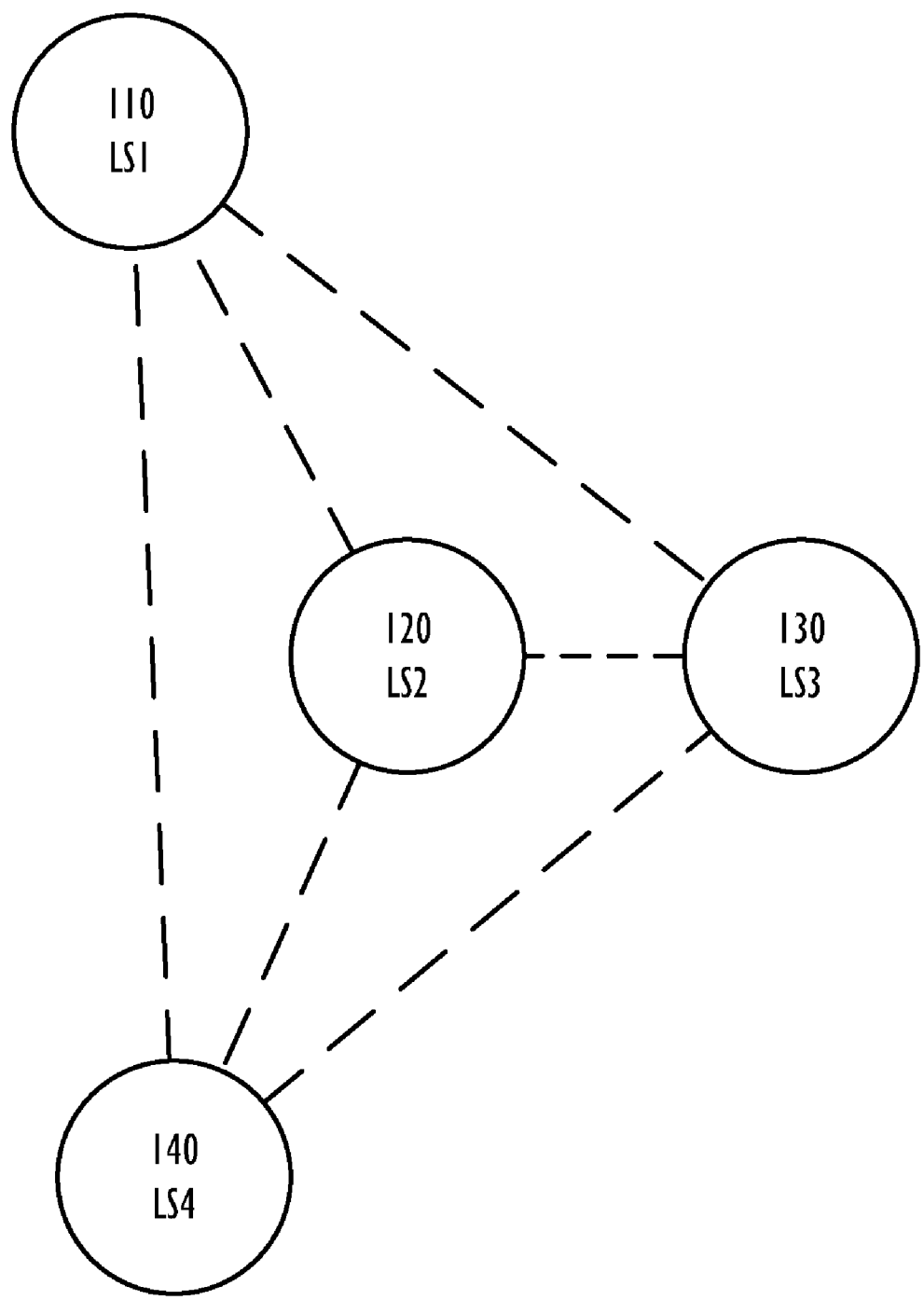
FIG. 1 is a complete graph illustrating an example network of logical switches and logical links according to one embodiment.

The figures depict embodiments of the present invention for purposes of illustration only. One skilled in the art will readily recognize from the following discussion that alternative embodiments of the structures and methods illustrated herein may be employed without departing from the principles of the invention described herein.

DESCRIPTION OF EMBODIMENTS

In the following description, for purposes of explanation, numerous specific details are set forth in order to provide a thorough understanding of the invention. It will be apparent, however, to one skilled in the art that the invention can be practiced without these specific details. In other instances, structure and devices are shown in block diagram form in order to avoid obscuring the invention. References to numbers without subscripts are understood to reference all instance of subscripts corresponding to the referenced number. Moreover, the language used in this disclosure has been principally selected for readability and instructional purposes, and may not have been selected to delineate or circumscribe the inventive subject matter, resort to the claims being necessary to determine such inventive subject matter.

Furthermore, although the following description is set forth in terms related to software, embodiments can be implemented in software, firmware, hardware, or any combination thereof.

Although the following description is set forth in the context of a Fibre Channel (FC) switch chassis, the present invention is not limited to Fibre Channel technology and could be implemented in other types of switched-based fabrics. Furthermore, "fiber" is used throughout this description as a generic term that can indicate either an optical or a copper cable.

Furthermore, although the following description is written in terms of logical inter-switch links among logical switches of a virtual fabric, the techniques disclosed herein may be used to connect any group of logical switches with physical connections between corresponding physical switches.

In a default configuration, an entire Fibre Channel switch chassis can be considered as a single logical switch. According to the embodiments described herein, the switch can be partitioned into multiple logical switches. Although many of the following examples of partitioning show partitioning a switch into two logical switches, the cardinality of the partitioning is illustrative only and limited to a small number of logical switches for clarity of the drawings.

Each logical switch acts as a single Fibre Channel switch, with a collection of zero or more user visible ports. Each logical switch can support at least E, F, and FL ports, as those port types are defined by the Fibre Channel standards. Each logical switch behaves as a complete and self-contained FC switch, with fabric services, configuration, and all fabric characteristics associated with a physical FC switch.

Management of the switch chassis is performed as management of a collection of logical switches, whether there is only one logical switch or a plurality of logical switches. Some chassis management functions, for example, the partition configuration management, span logical switch boundaries, but users can separately manage logical switches independently.

In addition to partitioning a chassis into logical switches, the logical switches are assigned to virtual fabrics, also known as logical fabrics. In one embodiment, each logical switch is assigned to a different virtual fabric, and only one logical switch can be associated with a virtual fabric in a particular chassis. A virtual fabric can be a single-chassis virtual fabric, or can span multiple chassis, which allows creating multi-chassis virtual fabrics comprised of logical switches in different chassis. In the following disclosure, references to a fabric should be understood as a reference to a virtual fabric unless otherwise stated.

Embodiments of chassis management functions related to partitioning the chassis into virtual switches include the ability to create a logical switch, assigning the logical switch to a virtual fabric, adding ports to the logical switch, deleting ports from the logical switch, deleting the logical switch, and changing the assignment of the logical switch to a different virtual fabric. In some embodiments, security constraints can be placed on the chassis management functions, such as requiring permission to effect any chassis management operations. Additionally, users can be given rights to control one virtual fabric in a chassis, but not another.

Physical ports on the chassis are assigned to logical switches. Chassis management functions allow moving ports between logical switches in one embodiment, forcing a port offline when moved from one logical switch to another. In one embodiment, a logical switch with zero ports assigned to it is automatically deleted.

Because physical ports are assigned to logical switches, the concept of a user port is introduced. A user port is a port assigned to a logical switch, and bound to a physical port. Each logical switch has its own port index, but unlike a conventional switch without logical switches, the port index values are associated with a user port number, and depending on the configuration of the chassis, may not be the same as the physical port number. FC addresses include the user port number and are dynamically allocated when a port is assigned to a logical switch. In one embodiment, FC addresses are not unique across logical switches, because user port numbers are not unique across logical switches. In one embodiment, physical and user port numbers within a chassis do not change, regardless of the logical switch to which the port is assigned. Therefore, when a port is moved from one logical switch to another, both physical and user port numbers stay unchanged. In that embodiment, the port indexes are assigned at the time of being added to a logical switch and are assigned sequentially. When a port is removed from the logical switch, the port index slot becomes free.

The ports of logical switches are connected to external devices or can be connected to ports of other switches of other chassis in the same virtual fabric through inter-switch links, which can be dedicated physical links connecting the physical switch to another physical switch, or logical links that use the services of other physical links to carry the traffic across the logical link.

A base fabric is a routable network that carries traffic for multiple virtual fabrics. A base fabric is formed by connecting specially designated logical switches from each chassis. These special logical switches are called base switches. ISLs within the base fabric are called eXtended ISLs (XISLs). XISLs are, by default, shared by all virtual fabrics, although sharing can be limited to one or more fabrics to provide quality of service (QoS). Logical links created between logical switches across the base fabric are called Logical ISLs (LISLs). LISLs represent reachability between logical switches across a base fabric and are not related to XISL topology. A base fabric can also contain legacy L2 switches since multi-fabric traffic is carried using encapsulated headers, as discussed in more detail below.

ISLs assigned to a physical port of a non-base switch are called Dedicated ISLs (DISLs). These DISLs are dedicated to a particular logical switch and only carry traffic for a virtual fabric associated with the logical switch. In other word, E_ports associated with a base switch form XISLs, while E_ports associated with a non-base switch form DISLs. If an XISL is shared by one fabric, it still carries protocol traffic associated with multiple fabrics, in addition to carrying data traffic for just one fabric. In some embodiments, a base fabric can also be configured to have DISLs. For example, a non-base switch can be used within a base fabric to connect two base switches. In such case, a DISL is carrying traffic within the base fabric, which is multi-fabric by nature.

Preferably, a base fabric is kept unburdened with unnecessary configuration and protocols, so that the chance of segmenting or disrupting the shared resource is minimized. Thus, in one embodiment, F_ports within a base fabric are prohibited. In other embodiments, F_ports can be in a base fabric as required for legacy configuration support and migration.

ISLs to link logical switches in a virtual fabric can be either direct links between logical switches, or can be LISLs defined over XISLs. In the latter situation, logical switches are configured in each chassis as base logical switches. ISLs are defined to connect the base logical switches into a single base fabric. The base logical switches are logical switches, and can be, but do not have to be, the default logical switch for their respective chassis. The ISLs connecting the base logical switches are configured as XISLs, which can be shared to carry traffic for multiple fabrics. Thus, logical switches that are assigned to a virtual fabric would communicate with each other by routing traffic to their corresponding base switch, and then to other logical switches across the XISLs connecting the base switches using a logical link between the logical switches.

LISLs are a logical representation for a connection through a base fabric between two logical switches in a virtual fabric. A LISL behaves like a regular E_port-connected ISL, allowing FC services over LISLs.

As in a layer 2 fabric, the scalability of a virtual fabric is limited by the computational and memory resources required to maintain the topology of the virtual fabric. The resource requirements on a chassis and a network as a whole are exponentially proportional to the (a) total number of LISLs in the chassis for all logical switches and (b) the total number of LISLs in the virtual fabric. Thus, a virtual fabric preferably has as few logical links as possible, in order to limit the resource consumption.

At the same time, other factors encourage higher numbers of LISLs. A robust fabric should be able to contain or minimize the impact of network changes. These network changes could be the result of management operations, or failures of hardware or software. Maintaining connectivity between end devices as long as there is physical connectivity between the devices is desirable. Thus, the number of switches that need to be removed to disconnect the topology should be as high as possible. Moreover, when the topology does become disconnected, the topology should be repaired in a way that leaves all logical switches in a virtual fabric connected. This tends to lead to a higher number of LISLs.

Similarly, topology changes should minimize disruption of the virtual fabric. When a logical switch is added to the virtual fabric, the disruption to the virtual fabric preferably is minimized. When a logical switch is removed from the virtual fabric, then the disruption to the virtual fabric is preferably limited to the LISLs connected to that logical switch.

In addition, operators of a virtual fabric desire manageability, which typically implies simplicity and that the logical topology should be as close to the physical topology as possible. Manageability is improved if the logical topology formed for a given physical fabric is deterministic.

Moreover, for performance reasons, a logical topology that minimizes the number of hops between any two logical switches is preferable.

FIGS. 1 to 4 illustrate various topologies in a simple graph format. Each logical switch is a node, sometimes referred to as a vertex, in the graph, and each logical or physical link is represented by an edge of the graph, i.e., a line between two nodes. In FIGS. 1 to 4, logical links are indicated by dashed lines and physical links are indicated by solid lines. Although traffic between logical switches tunnels over physical links and is not direct between any two logical switches, for purposes of clarity of the drawings, logical links are shown as directly connecting two logical switches.

Figure 2:
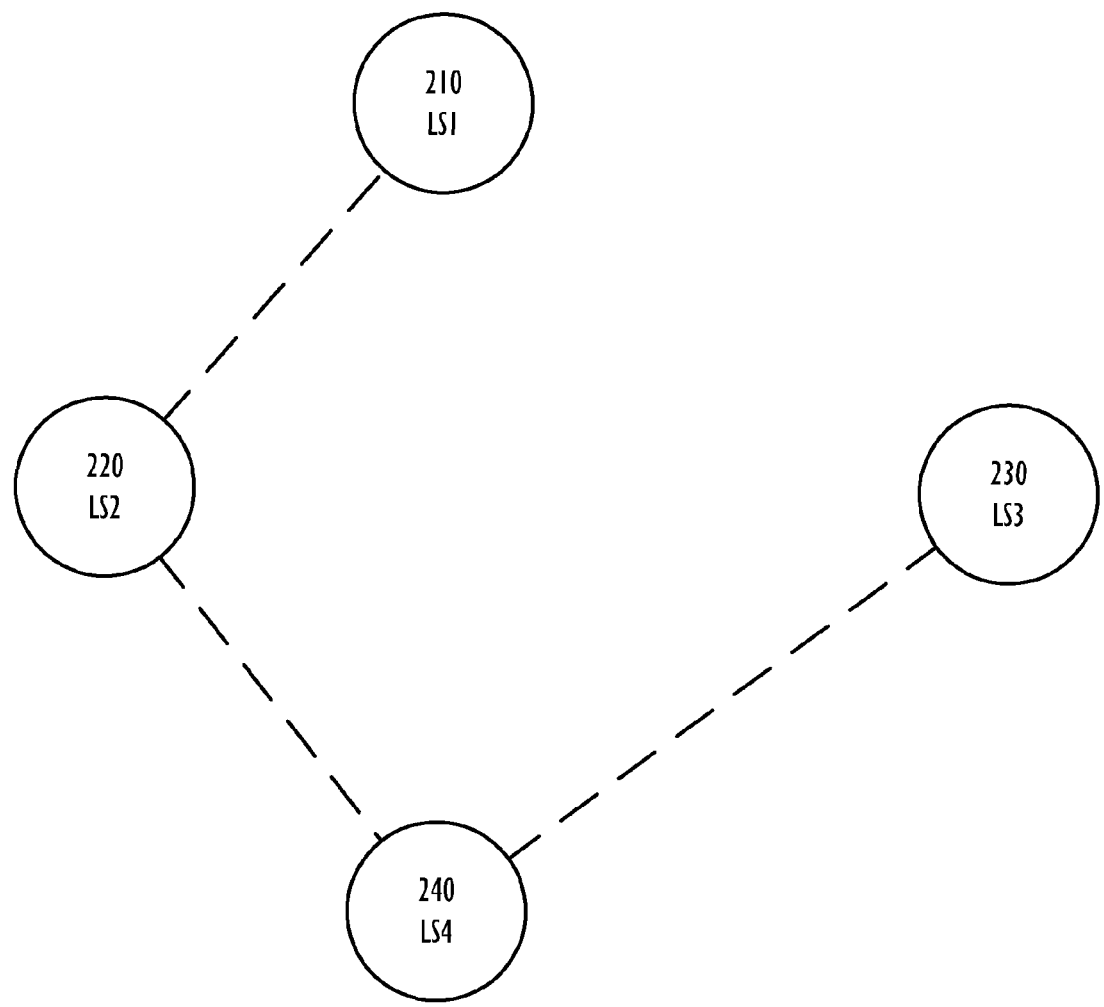
FIG. 2 is an incomplete graph illustrating another example network of logical switches and logical links.
Figure 3A:
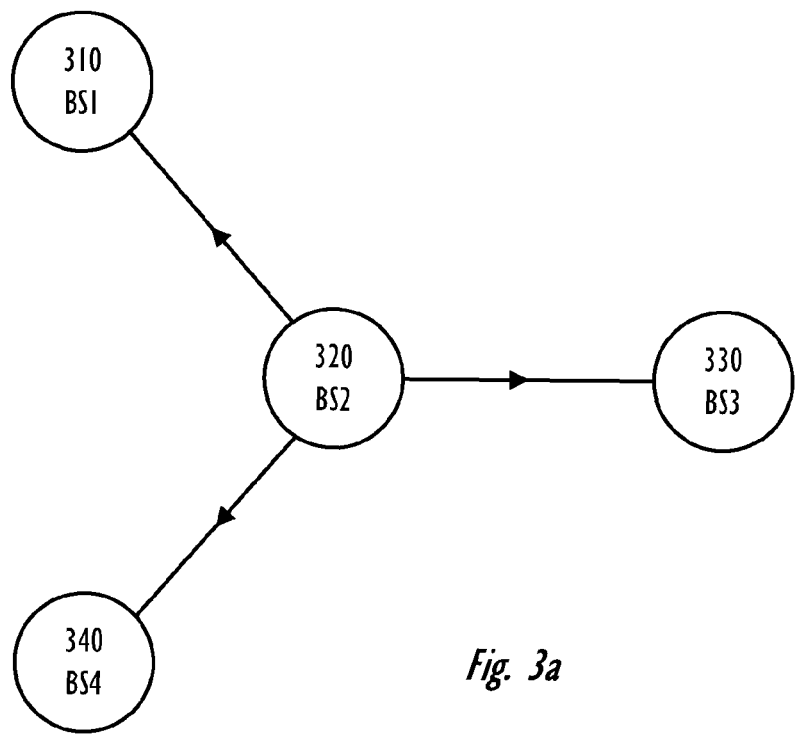
FIG. 3a is a graph illustrating a network of base switches and inter-switch links.
Figure 3B:
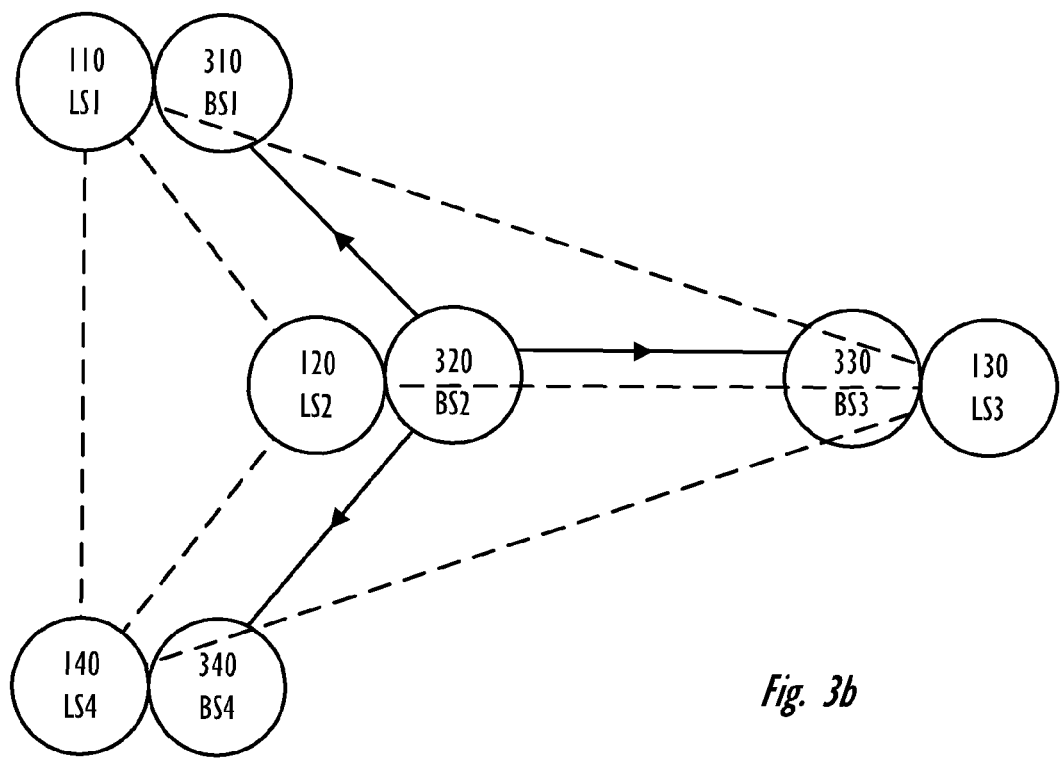
FIG. 3b is a graph illustrating the network of FIG. 3a overlaid with the network of FIG. 1.
Figure 4:
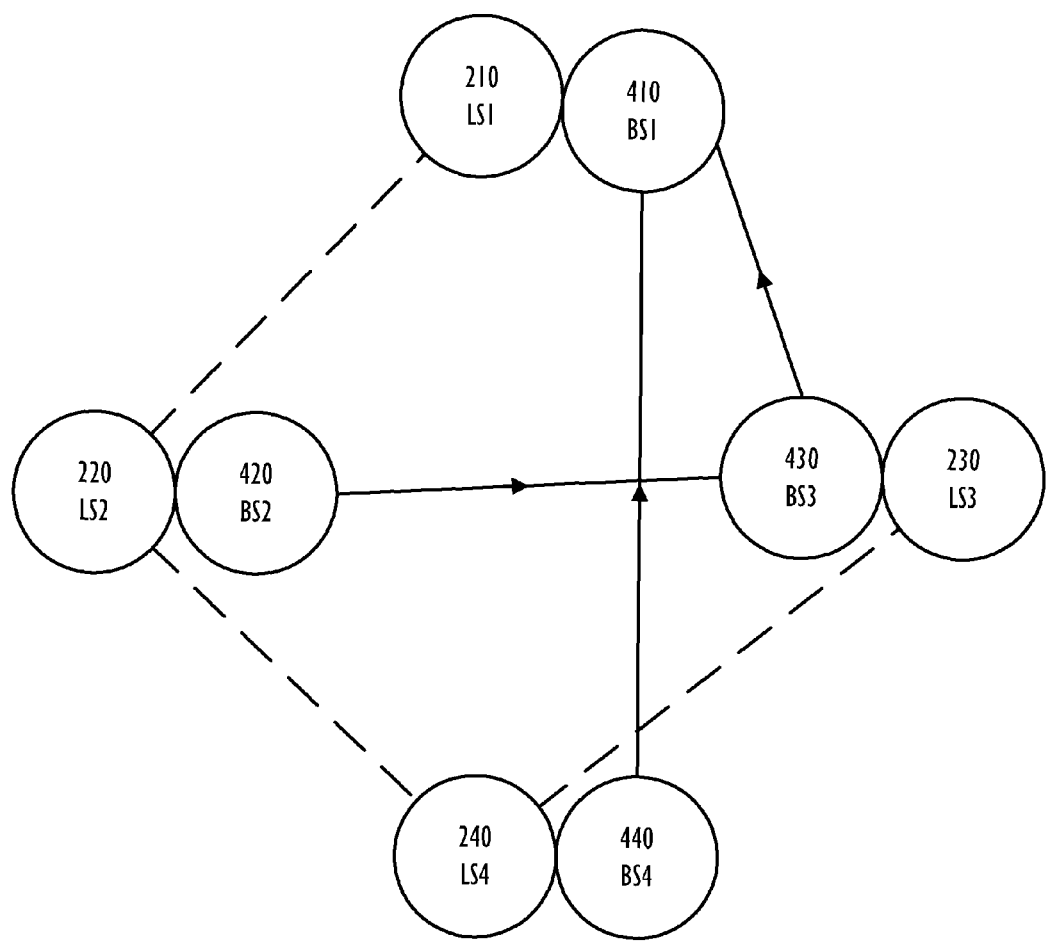
FIG. 4 is a graph illustrating the network of FIG. 2 overlaying a graph of an example network of base switches and inter-switch links.

FIG. 1 is a four-node graph illustrating a full mesh of six logical links between each pair of nodes 110, 120, 130, and 140. FIG. 2 illustrates another network of four nodes 210, 220, 230, and 240, with a minimal set of four logical links between the nodes. A virtual fabric linked as in FIG. 1 is more robust than the virtual fabric of FIG. 2, because eliminating any single link or node would leave all of the remaining nodes connected, but the virtual fabric of FIG. 2 is more scalable. FIG. 3a illustrates a set of base switches 310, 320, 330, and 340, and physical links connecting them in a star configuration. FIG. 3b illustrates the same full mesh of logical links of FIG. 1, together with the corresponding physical nodes and edges of FIG. 3a, in a configuration where the physical links of FIG. 3a are closely aligned with the logical links of FIG. 1. FIG. 4 illustrates a configuration where the minimally connected logical graph of FIG. 2 is combined with another configuration of physical links between corresponding base switches 410, 420, 430, and 440, where the mapping between physical links and logical links is not aligned.

Based on the above characteristics, three metrics for preferring one topology over another are: (1) the number of logical links in the topology, with lower numbers preferable to higher; (2) the connectivity of the logical topology, with higher connectivity preferable to lower; and (3) the mapping of the logical topology to the physical topology, with closer mappings preferred over less close mappings. Other metrics for preferring or choosing one topology over another can be used as desired.

The above topology characteristics conflict with each other, therefore no topology can optimize all three characteristics in any non-trivial topology. For example, high connectivity (useful for robustness) implies a large number of logical links, but tends to result in lowered scalability because of the number of links. On the other hand, high scalability prefers minimizing the number of logical links, which negatively affects the robustness of the virtual fabric because of the lower connectivity. Similar tradeoffs exist between a closer mapping between virtual and physical fabrics and either scalability or robustness.

Not every operator of a virtual fabric would choose the same tradeoff point when optimizing the topology of the virtual fabric. Some operators may prefer scalability over robustness, others may prefer robustness over scalability, and others may prefer to try to balance those two characteristics with a variety of balance points.

In one embodiment, an operator can create a wide range of topologies based on the relative importance of the defined characteristics. In some embodiments, the relative importance is user driven, while in others, the relationship between the characteristics is based on a heuristic.

The relative importance of the robustness and stability characteristics can be quantified with a topology factor, which in one embodiment is a fabric wide parameter value that can be set by an operator of the virtual fabric. In one embodiment, the topology factor takes on values between zero and one, but any desired range of values can be used. In one embodiment, the topology factor is set to higher values for higher robustness and lower scalability and lower values for higher scalability and lower robustness, but other embodiments can use alternate values.

In one embodiment, the topology factor may be determined dynamically, based on factors that include the number of switches (logical and physical), as well as the throughput of the physical links connecting physical switches. If the topology factor changes, the reconfiguration of the logical topology may be performed at that time, or may be performed at a later time.

For example, if maximum scalability is preferred, then the topology factor is set to zero, resulting in a topology with as few logical links as possible, but which is potentially subject to disconnecting parts of the network if one of those logical links is offline or removed. If the topology factor is set to one, then a full mesh topology results. Where scalability and robustness are to be equally balanced, a topology factor of 0.5 results in a partial mesh topology that provides an optimal balance between scalability and connectivity. For any given topology factor value, each of the three characteristics of robustness, scalability, and manageability are preferably optimized to the extent possible.

At a high level, logical topology formation involves forming the physical fabric, then for each virtual fabric, determining the nodes (logical switches) that are part of the virtual fabric and creating logical links between adjacent logical switches. Determining logical adjacency involves determining the degree of the node in the virtual fabric using the physical fabric and determining the adjacency of the node in the virtual fabric using the physical fabric.

The degree of a node in a graph is the number of edges or lines that connect that node to other nodes. For example, a node not connected to any other node has a degree of zero. A node with a single connection to another node has a degree of one. In addition, a node with five edges or connections to other nodes has a degree of five. Two nodes are adjacent to each other in a graph if there is an edge directly connecting the two nodes, even if a visual representation of the graph places the nodes in different parts of the graph. Referring back to FIG. 2, for example, nodes 230 and 240 are adjacent to each other, but neither is adjacent to node 210, even though a path exists from both nodes 230 and 240 to node 210 through node 220. In FIG. 1, every node in the graph is adjacent to every other node in what is known as a complete graph.

As can be seen from the above, two graphs are used in this technique, a physical graph of the base fabric representing the physical fabric base switches and physical links between the base switches, and a logical graph, representing the virtual fabric of the logical switches and logical links between them. Each base switch is a node of the physical graph, and each physical link of the base fabric is an edge of the physical graph, although if two base switches have multiple physical links between them, there is just one edge in the physical graph between the corresponding nodes of the graph, representing the adjacency of the two base switches. Likewise, each logical switch is a node of the logical graph and each LISL is an edge. As domains come online or go offline in the base fabric, nodes are added or deleted in the physical graph. A similar change to the logical graph is made as logical switches or LISLs come online or go offline. Any technique known in the art can be used for representing and storing the graph in the physical switch.

In embodiments where a Fabric Shortest Path First (FSPF) module already maintains the physical graph, such embodiments can use the FSPF-maintained graph if the FSPF-maintained graph provides the degree of every node in the base fabric and the cost of paths between every node and every other node in the graph, representing the cost of sending traffic over the physical links. Other routing protocols may be used as desired for calculating the best path between physical and logical switches.

In one embodiment, the graph is of the form known as a weighted undirected simple connected graph, i.e., each edge has an associated weight (in FSPF terms, the cost of the link), no single node loops are allowed (no edges have both endpoints at the same node), traffic can traverse an edge in either direction, and there is a path between any node and any other node in the graph.

Any connected graph can be made disconnected by the deletion of some number of nodes or edges so that there is no path between at least two nodes in the graph. The connectivity of a graph, sometimes known as the vertex connectivity of the graph, is defined as the size of the smallest set of vertices whose deletion would render the graph disconnected. The edge connectivity of a graph is defined as the size of the smallest set of edges whose deletion would render the graph disconnected. Unless otherwise indicated, connectivity as used herein should be understood to mean vertex connectivity. The connectivity of a graph can be increased by adding an additional edge to the graph and decreased by deleting vertices and their associated edges or by deleting edges only, without deleting any vertices.

The cost of the edge is the cost of the physical link or links between the two connected base switches represented by the graph nodes. If only one physical link connects the two base switches, the cost of the edge is the cost assigned to that link; if multiple physical links connect the two base switches, the cost of the edge is a function of the cost of the multiple physical links. The cost typically is based on the speed of the physical link, but other schema for assigning a cost can be used. Where the cost is speed based, the cost of a collection of links in one embodiment is determined by the cost of the highest speed link of the collection of physical links, but other techniques for determining the cost of a collection of links can be used. The cost of a path from each node to each other node in the physical graph is maintained for each node, and is used for creation of the logical graph.

Each virtual fabric is represented as a logical graph, which should also be a weighted undirected simple connected graph. Each logical switch that is configured to be part of the virtual fabric is represented as a node in the logical graph. Nodes in the logical graph have a many-to-one relationship with a node in the physical graph, even in embodiments where only one logical switch in a chassis can have be part of a given virtual fabric, because a logical switch can have multiple logical links that traverse a single base switch in the base fabric. Edges connecting nodes in the logical graph represent adjacency between the logical switch nodes and have a one-to-one relationship with LISLs.

In one embodiment, a heuristic is used to decide upon the links added to the nodes in the virtual fabric based on satisfying three characteristics of the topology: (1) mapping with the physical graph, (2) maintaining connectivity of the graph, and (3) minimizing the number of hops between any two nodes in the graph. For each node L in the logical graph, D(P) logical links should be established, where D(P) is the degree of the physical node P associated with the logical node L. These characteristics may be directly or indirectly manipulated or determined by the techniques disclosed herein.

According to one embodiment, the logical adjacency for each node L is determined by (a) pruning the physical graph to remove unnecessary nodes, (b) defining logical links to maintain the physical topology mapping, (c) establishing logical adjacencies to other nodes to maintain connectivity of the graph, and (d) increasing the connectivity to increase robustness, based on the topology factor.

Figure 5:
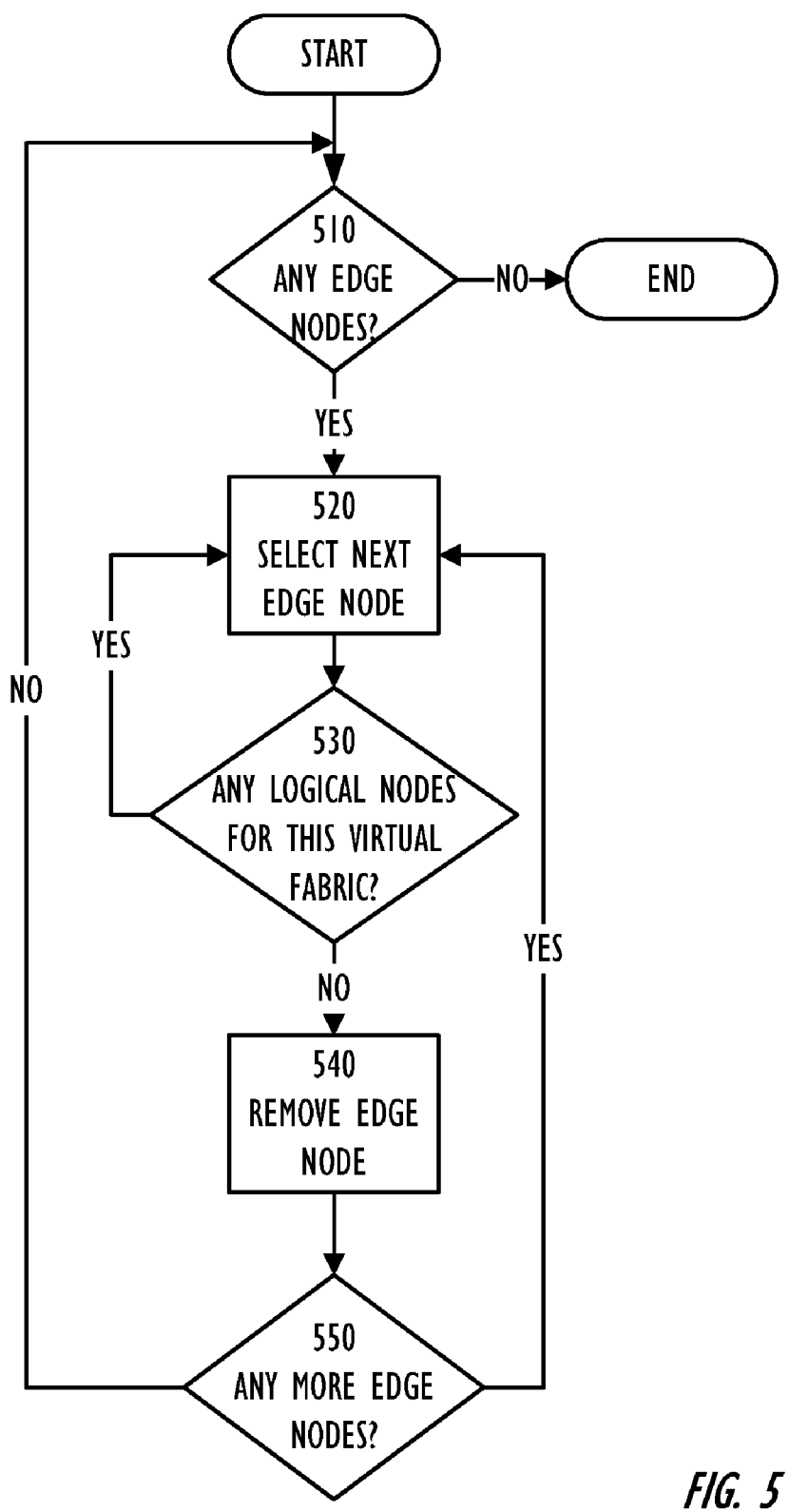
FIG. 5 is a flowchart illustrating a technique for pruning a graph representing base switches and inter-switch links according to one embodiment.

Graph pruning removes edge nodes of the physical graph with no logical nodes in the virtual fabric. An edge node in a graph is a node with a degree of one, indicating that it has only a single neighbor. FIG. 5 illustrates an exemplary technique for pruning the physical graph.

In block 510, the graph is examined to determine if it contains any edge nodes. If not, then the pruning is complete. If there are any edge nodes, then in block 520 the first (or next) edge node is selected, and block 530 determines whether there are any logical nodes for this virtual fabric associated with this base switch. If there are, repeat the selection of the next node in block 520. If there are no associated logical nodes with this edge node of the physical graph, prune the node in block 540, removing it from the physical graph, then if there are any additional edge nodes (block 550) repeat block 520 and select the next edge node. If there are no more edge nodes, then repeat the determination of block 510, because pruning edge nodes may have changed graph nodes that were previously not edge nodes into edge nodes. The result is a physical graph with only nodes that have a logical switch in the current virtual fabric or that are on a path between two nodes that have logical switches. This pruned physical graph is then used for determining the logical graph.

The technique described above for pruning the physical graph is illustrative and by way of example only, and other techniques for pruning the graph can be used.

Figure 6:
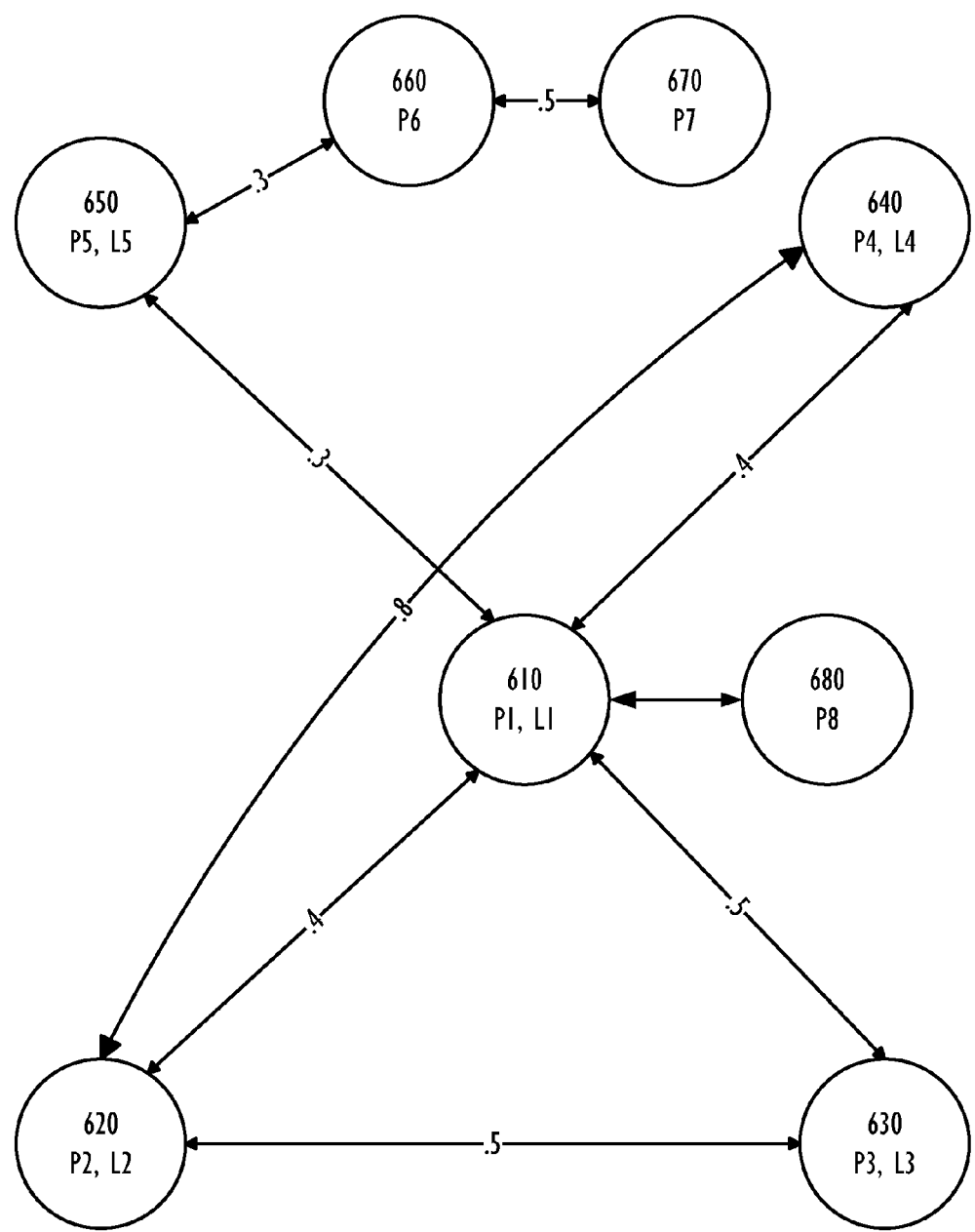
FIG. 6 is a graph of an example network of base switches and inter-switch links illustrating associated costs of the inter-switch links.
Figure 7:
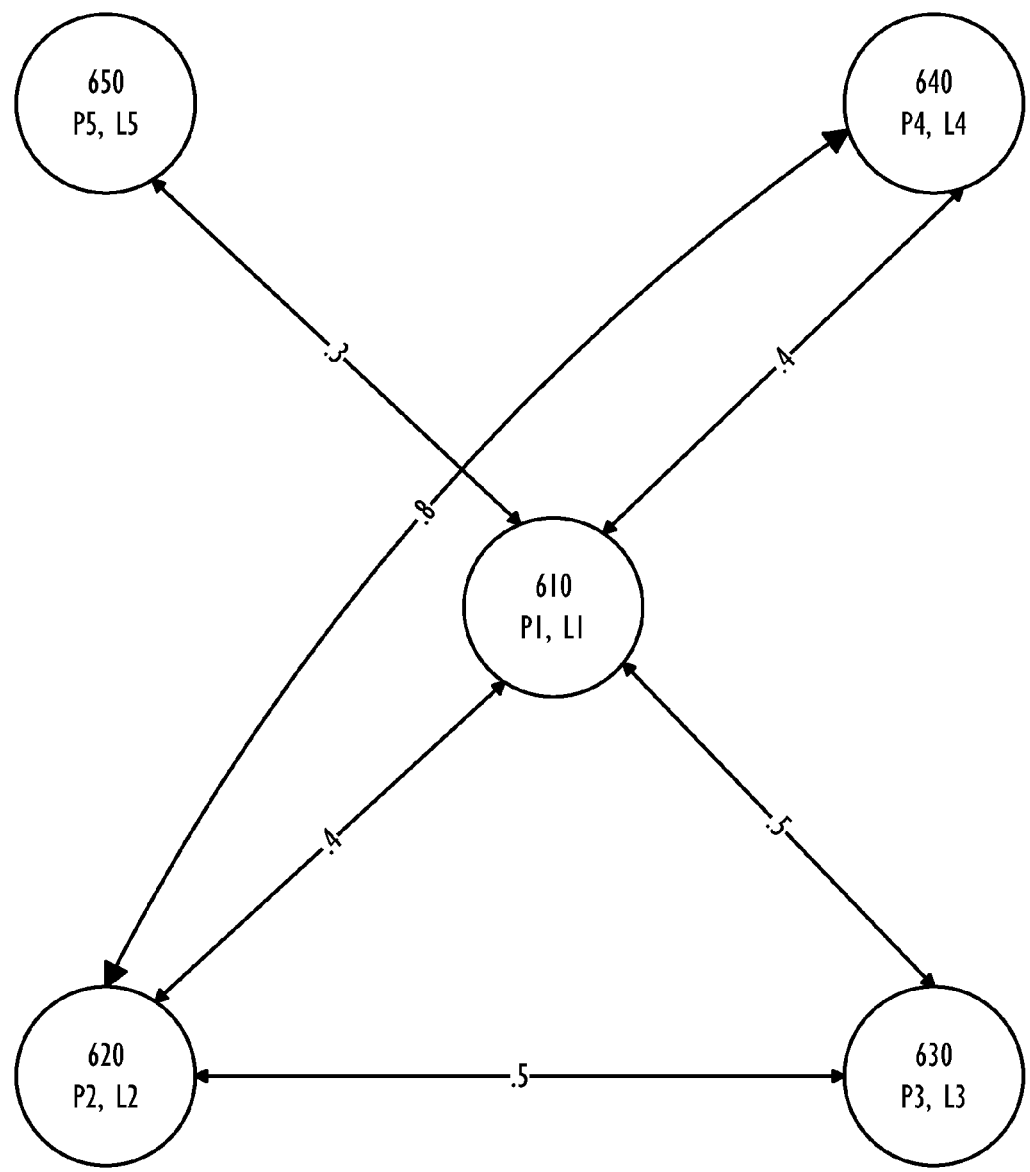
FIG. 7 is an graph showing the result of pruning the graph of edge nodes using the technique of FIG. 5.

FIG. 6 is an example of an unpruned physical graph with eight nodes 610-680, representing base switches P1-P8, where nodes 610-650 (base switches P1-P5) have logical switches L1-L5 associated with the virtual fabric currently being configured. In a first pass through the graph, nodes 670 and 680 are determined to be edge nodes. Examining each of them in turn, the technique of FIG. 5 determines that no logical switch of the current virtual fabric is associated with base switches P7 and P8, so nodes 670 and 680 are pruned from the physical graph. Re-examining all of the nodes after the first pass, node 660 (base switch P6) now is discovered as an edge node, even though it was not an edge node in the original physical graph. As with nodes 670 and 680, base switch P6 has no logical switch associated with it in the current virtual fabric, so node 660 is also pruned from the physical graph. During this stage of the analysis, the costs of each path, shown on the edges in FIG. 6, does not come into play. The resulting pruned graph is shown in FIG. 7.

Figure 8:
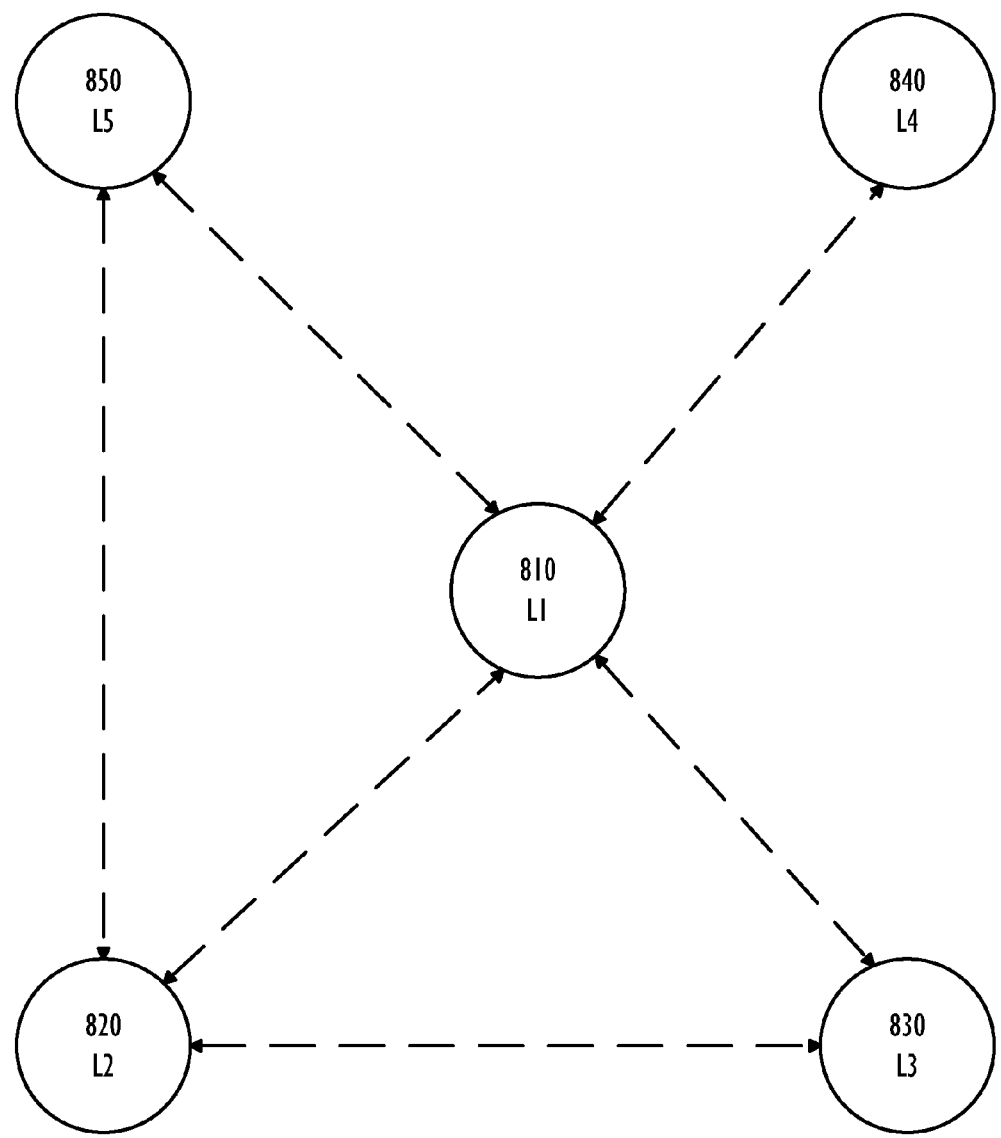
FIG. 8 is a graph of an example collection of logical switches and logical inter-switch links corresponding to the base switches and inter-switch links of FIG. 7.

The next step is to create logical links between the logical switches of the current virtual fabric to maintain the physical topology mapping. For each node P of the pruned physical graph of FIG. 7, compute a degree of the node, denoted by PMD(P) (Physical Mapping Degree). PMD(P) is always non-zero, because the graph is a connected graph. Even though the graph was pruned of unnecessary edge nodes, it may still have edge nodes, so some nodes may have a PMD of one. For the logical switch associated with physical node P, create PMD (P) logical links to the closest nodes in the logical graph. In one embodiment, the closest logical nodes are determined by the cost in the physical graph of the physical links between the base switches on the path between the logical switches. This step is performed for every logical switch in the virtual fabric, not just the logical switch of the local chassis. The result based on the physical graph of FIG. 7 is a logical graph shown in FIG. 8. As is illustrated in FIG. 8, a logical link is established between logical switches L2 (820) and L5 (850), instead of between L2 (820) and L4 (840), because the cost of the path between base switches P2 (620) and P5 (650), which passes through base switch P1 (610), is 0.4+0.3=0.7, less than the cost of either path between P2 (620) and P4 (640), both of which have a cost of 0.8. The result shown in FIG. 8 is a logical graph that ensures that the logical topology maps the physical topology as much as possible.

Figure 9A:
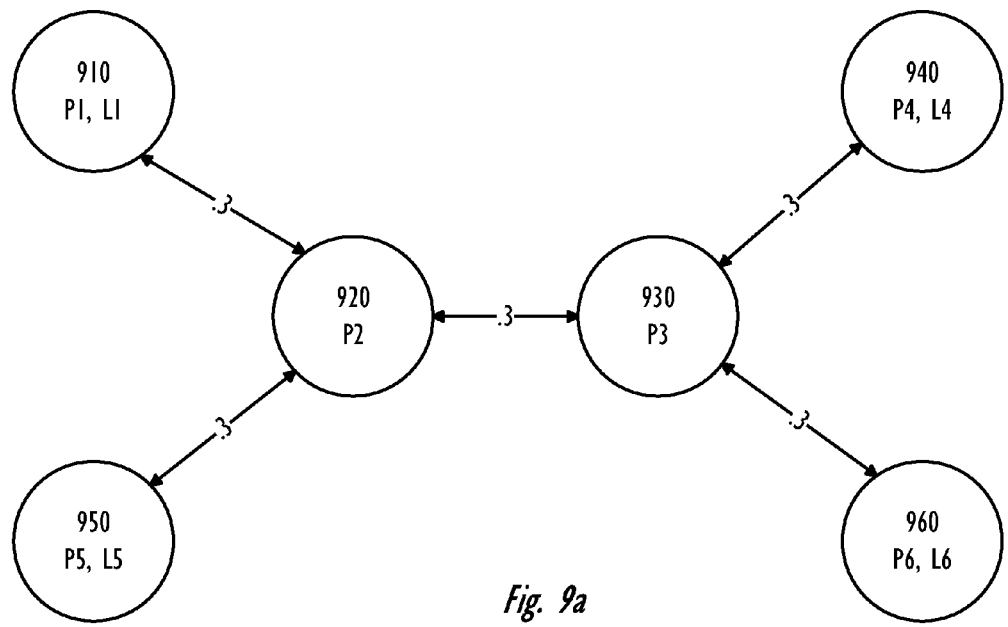
FIG. 9a is a graph of an example network of base switches and inter-switch links according to one embodiment, with associated link costs.
Figure 9B:
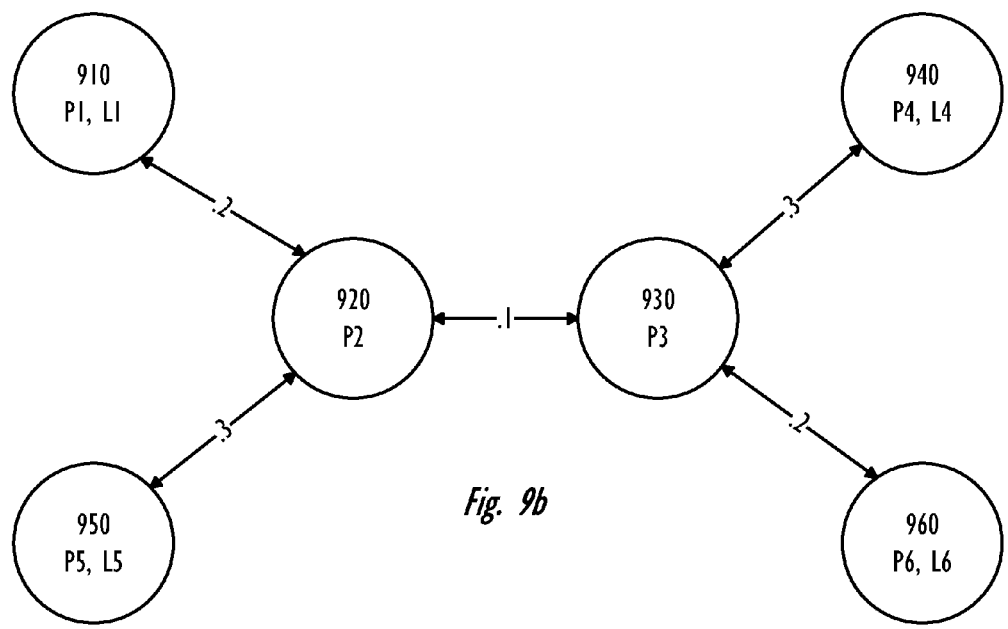
FIG. 9b is a graph of the example network of FIG. 9a with different link costs.

The initial creation of logical links can result in a disconnected logical graph. For example, consider the physical graph of FIG. 9a. In this example, physical switches P2 (node 920) and P3 (node 930) have no logical switches associated with the current virtual fabric, but could not be pruned because they are on a path between two other base switches that do have associated logical switches. The result of the initial assignment of logical links results in the logical graph shown in FIG. 10, which has two disconnected portions: (1) L1 (1010) and L5 (1050) and (2) L4 (1040) and L6 (1060). Because the logical graph should also be a connected graph, at least one additional logical link must be created between the two disconnected portions. Notice, by the way, that changing the costs of the links of the physical graph could change the logical graph. For example, if graph of FIG. 9a is changed to that of FIG. 9b by changing the costs of the links between base switches, such that the cost of the link between nodes 920 and 930 is 0.1, and the cost of the links between nodes 910 and 920, and between nodes 930 and 960 is 0.2, then logical links would be established between nodes 910 and 960, and between nodes 940 and 950, which would be a different, but still disconnected logical graph.

Figure 11:
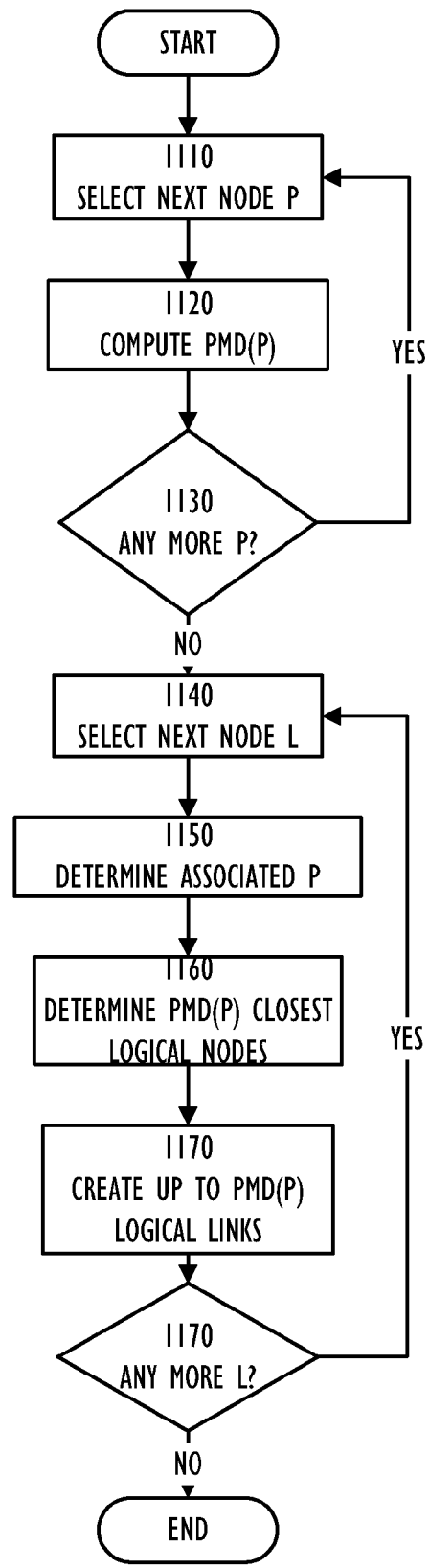
FIG. 11 is a flowchart illustrating a technique for determining whether to add a logical inter-switch link to a graph of logical switches to obtain a connected graph according to one embodiment.

FIG. 11 illustrates a technique according to one embodiment for initially creating logical links in the logical graph based on the underlying physical graph. In block 1110, select the first (or next) node P of the physical graph, then in block 1120, compute PMD(P) for that node. If there are any more nodes in the physical graph (1130), repeat blocks 1110 and 1120 for those nodes. Once PMD(P) has been computed for all P, then in block 1140, select a first or next logical node L. In block 1150 determine the physical node P associates with logical node L, then in block 1160 determine the PMD(P) closest nodes in the logical graph, based on the cost of the paths between L and the other nodes. Then in block 1170 create up to PMD(P) logical links between node L and the PMD(P) closest other nodes of the logical graph. If there are any more nodes in the logical graph (1170), then repeat blocks 1140-1170 for each other node L.

In one embodiment, the disconnected logical graph can be converted into a connected logical graph by creating logical adjacency either to a higher order node (based on the worldwide name of the logical switch) or to another logical node that would have created logical adjacency to a higher order node based on the initial creation of logical links. In some embodiments, the technique can be extended to include nodes that are multiple hops away, but for simplicity, limiting the path to two hops is preferable.

Because the initial creation of logical links outlined in is done for every logical switch in the logical graph, the logical switch of the local chassis (the local node) can be evaluated to verify if one of the conditions for adding additional logical links is satisfied by the initial creation of logical links. If neither a logical link to a higher order node link nor a logical link to another node that would have created logical adjacency to a higher order node was created in the initial link creation, then a single logical link is established to the closest node among the higher order nodes. In one embodiment, in case of equal cost paths, the highest order node will be selected for the additional logical link.

Figure 10:
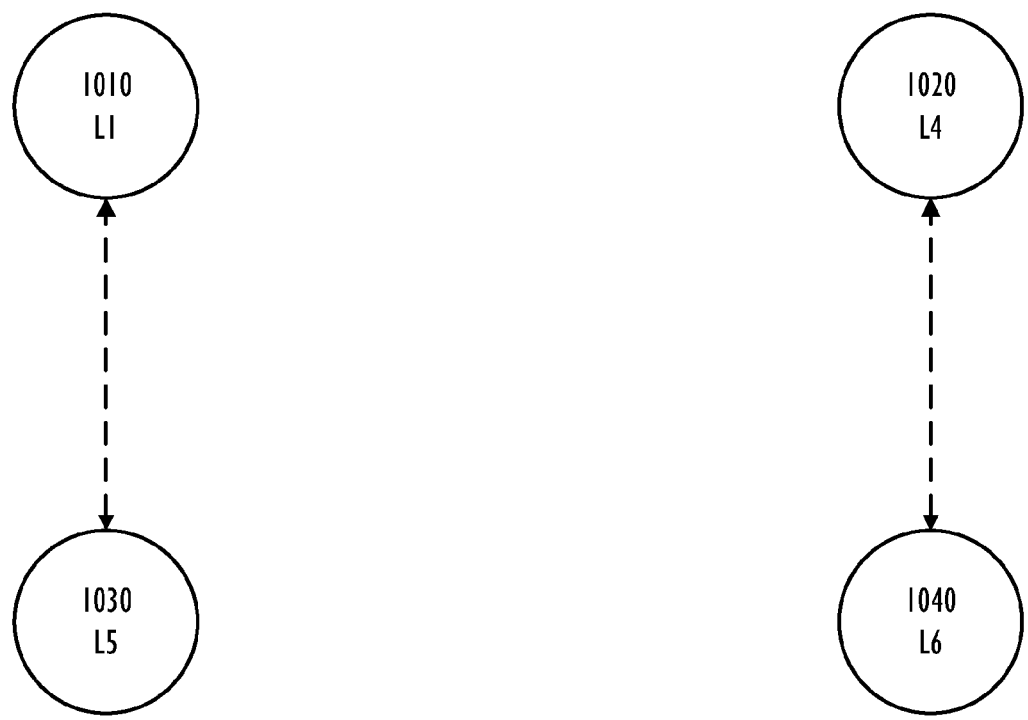
Figure 12:
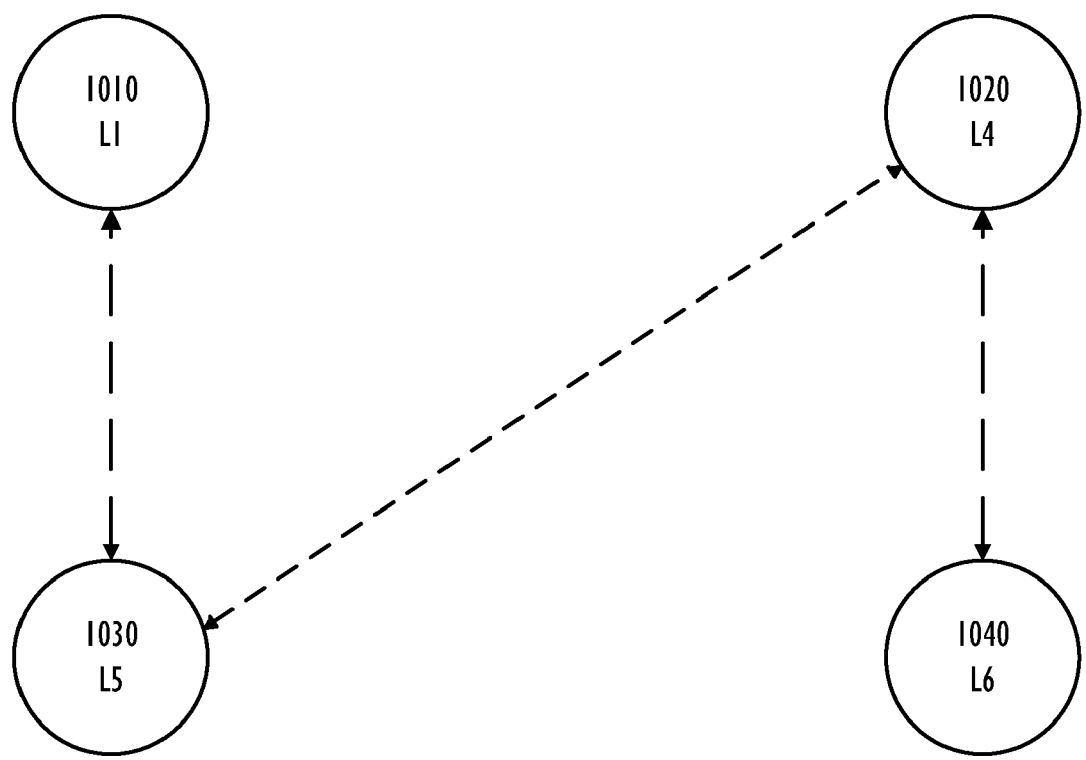
FIG. 12 is the graph of FIG. 10 with an additional logical inter-switch link added responsive to the technique of FIG. 11.

Continuing the example of FIG. 10, FIG. 12 illustrates the addition of a link between L5 and L4 added by this step, which connects the two disconnected portions.

Figure 13:
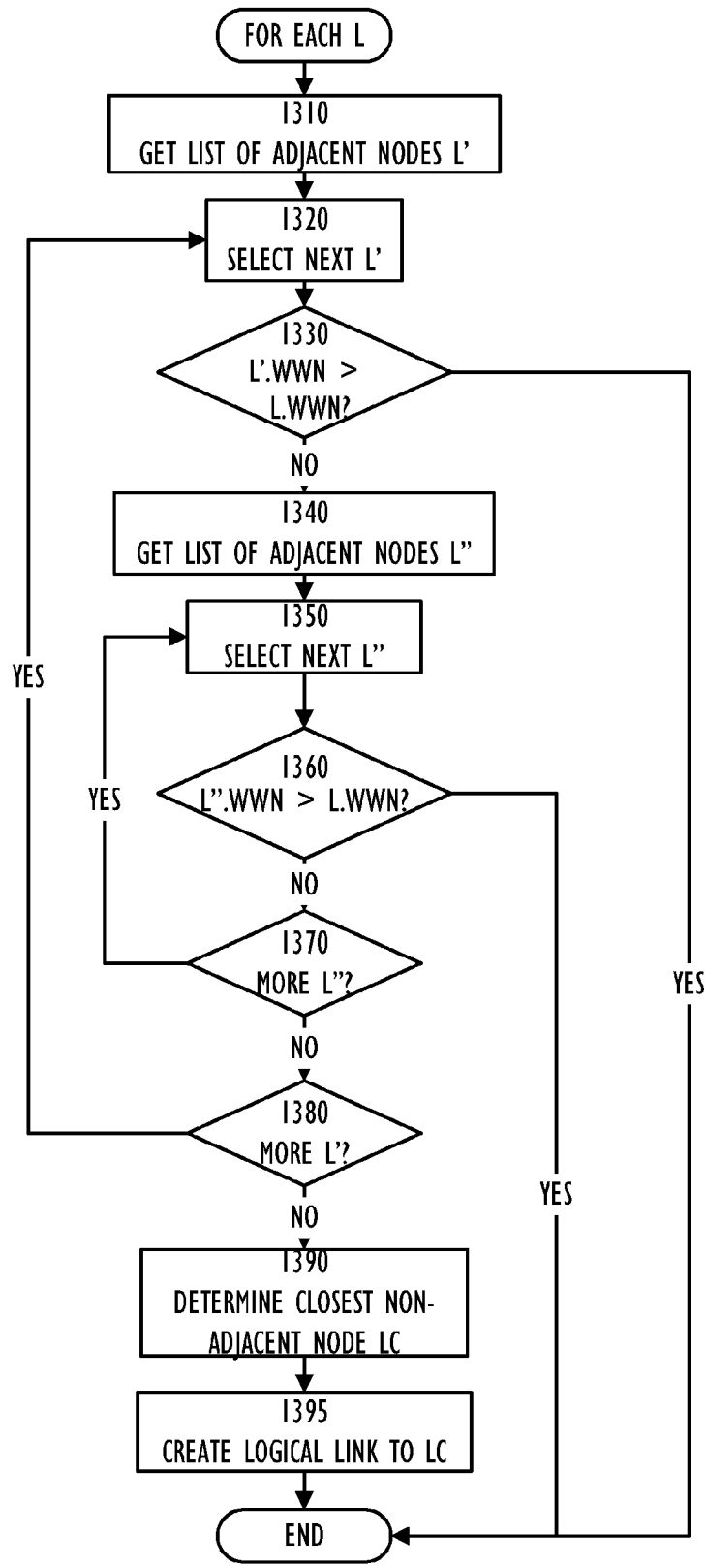
FIG. 13 is a flowchart illustrating a technique for adding additional logical inter-switch links to a graph of logical switches responsive to a topology factor according to one embodiment.

FIG. 13 illustrates one embodiment of a technique for determining which logical links to add to ensure connectivity of the logical graph. For each logical node L of the graph, in block 1310, obtain a list of the nodes L' that are adjacent to L in the logical graph. In block 1320, select the next L' and in block 1330 if the WWN of L' is greater than the WWN of L, no changes are necessary for this node L. Otherwise, in block 1340, obtain a list of the nodes L" that are adjacent to node L'. In block 1350, select the next node L". In block 1360, if the WWN of L" is greater than the WWN of L, then no changes are necessary for this node L. Otherwise, in block 1370, if there are any more nodes L", repeat blocks 1350-1370. If there are no more nodes L", then in block 1380, if there are any more nodes L', repeat blocks 1320-1380. If there are no more nodes L', then in block 1390 determine the closest non-adjacent node LC, and in block 1395 create a logical link between node L and node LC. A function of the connectivity of each logical switch L is denoted by CD(L), which is zero or one depending on whether an additional link was added using this technique. The result of this technique is a connected graph. The above technique is illustrative and by way of example only, and other techniques can be used that result in the addition of edges to the graph to connect disconnected portions of the graph of logical switches.

Thus far, the topology factor has not been used. The next step is to increase robustness based on the topology factor, by potentially adding logical links to increase the connectivity of the graph based on the topology factor. In one embodiment, additional logical links are created based on the following formula:

$$RD(L)=\text{Int}(\text{topologyfactor}*(N-1-PMD(P)-CD(L)))$$

where L is the number of the logical switch, topologyfactor is the topology factor; N is the number of logical nodes in the logical graph, and P is the node number of the base switch of the physical graph associated with the logical switch L. This formula determines how many links would be needed to make a full mesh topology, i.e., to make the logical graph a completely connected graph, then modifies that determination by the topology factor, allowing control over the connectivity of the resulting mesh of logical switches.

Additional robustness of the logical graph is provided by adding RD(L) additional logical links, to the closest nodes among all remaining logical nodes of the logical graph. This minimizes the number of hops in the logical topology. The number of additional logical links created in this step may be zero or greater, depending on the topology factor. The above formula is illustrative only, and other embodiments can use different formulas for modifying the topology responsive to the topology factor. In addition, although the examples below use a topology factor that is a single predetermined numeric value, other techniques for determining a topology factor can be used, including functions that can produce different values depending on a variety of inputs.

Continuing the example of FIG. 12, if the topology factor is a zero, then the result of this step will not result in any additional adjacency, leaving a minimally connected logical graph. And if the topology factor is a one, RD(L) will be computed as follows:

RD(1)=1*(4−1−1−0)=2, adding one link between L1 (1010) and L4 (1020) and a link between L1 (1010) and L6 (1040).

RD(4)=1*(4−1−1−1)=1, which would add one link between L4 (1020) and L1 (1010), except that it was already added when considering L1 (1010).

RD(5)=(4−1−1−1)=1, adding one link between L5 (1030) and L6 (1040).

RD(6)=1*(4−1−1−0)=2, which would add one link between L5 (1030) and L6 (1040), as well as a link between L6 and L1, except that both links were already added when considering L1 (1010) L5 (1030), so L6 has no non-adjacent nodes in the logical graph.

The result is a completely connected full mesh graph.

Figure 14:
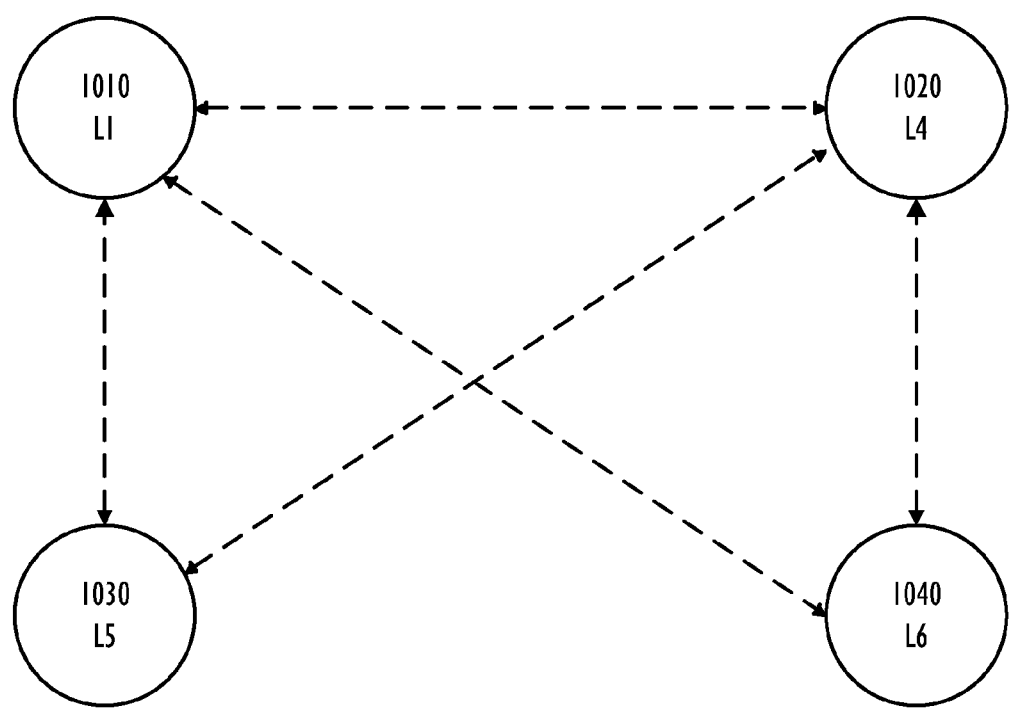
FIG. 14 is the graph of FIG. 12 with additional links added responsive to the technique of FIG. 13 using an example topology factor.

If the topology factor is 0.5, then the computation of RD(1) and RD(6) will both result in a value of one, while the computation of RD(4) and RD(5) will result in a value of zero (because of the truncation of 0.5 to an integer zero, since one half of a logical link cannot be created). The resulting partially connected graph will be as illustrated in FIG. 14, which is potentially more robust than the minimally connected graph of FIG. 11, since there are now three paths between any two nodes. This graph is potentially less robust than a full mesh graph that would be created by topology factor of one, which would create four paths between any two nodes, but presents less of a scalability concern, thus balances the two characteristics.

Figure 15:
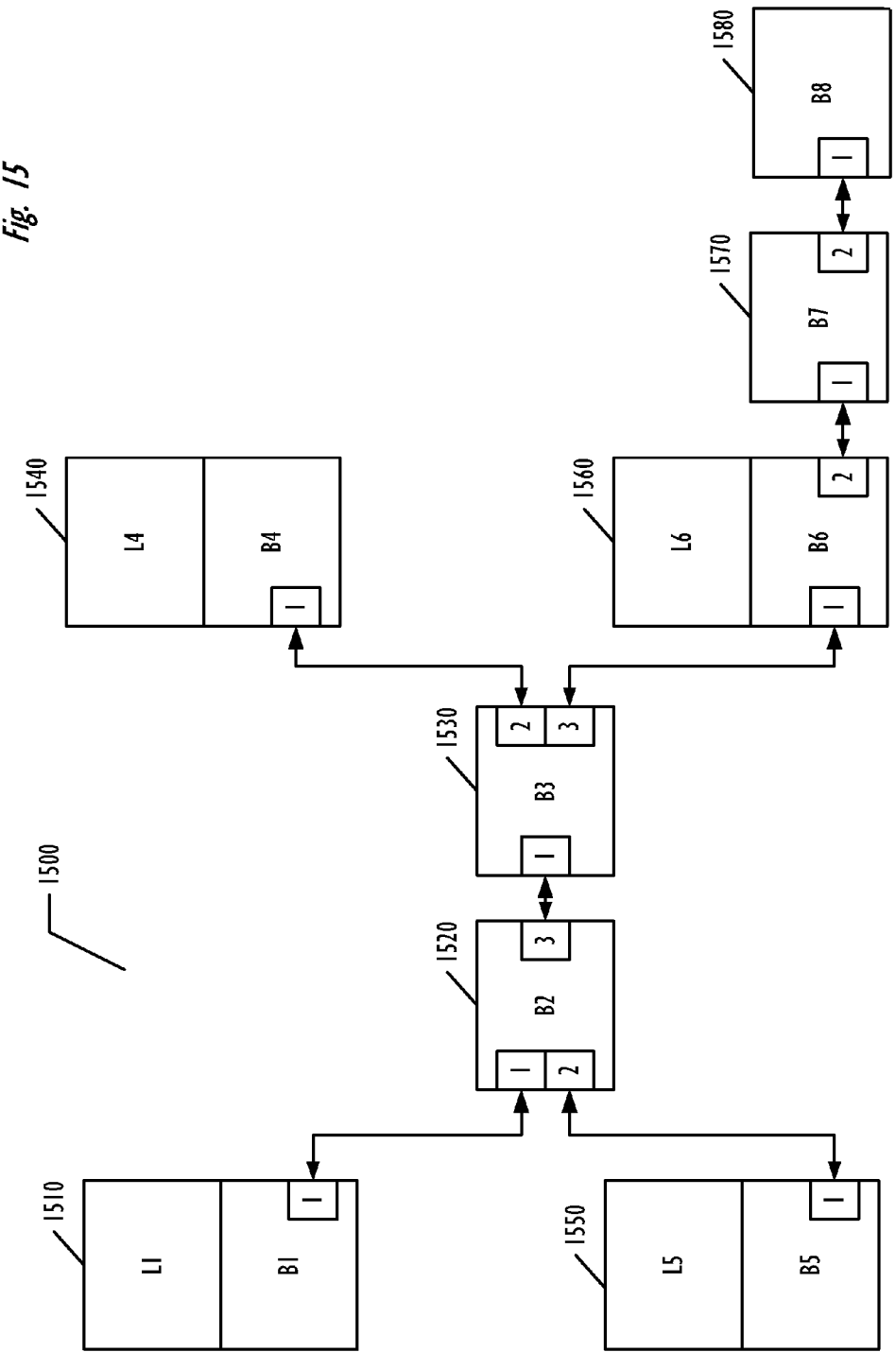
FIG. 15 is a block drawing illustrating a network of switch chassis and inter-switch links according to an example configuration.

FIGS. 15-18 illustrate a virtual fabric as it is manipulated to create logical links using the techniques described above. FIG. 15 is an example network 1500 of 8 switch chassis 1510-1580. Each switch chassis is shown with a base switch (B1-B8) and no more than one logical switch (L1-L8), which is the logical switch (if any) of that switch chassis that is assigned to the virtual fabric under consideration. Additional logical switches can be defined in any or all of the switch chassis 1510-1580 for other virtual fabrics, but are not shown in the figures for clarity of the drawings. Port numbers for the base switches and logical switches are shown only for ports used for connecting the virtual fabric, and the port numbers shown are illustrative and by way of example only. Inter-switch links and ports are indicated with solid lines for physical links and ports, and with dashed lines for logical links and ports. Where no logical switches are shown paired with a base switch, no logical switches of that switch chassis are assigned to the virtual fabric under consideration. Thus, for example, in FIG. 15, switch chassis 1520, 1530, 1570, and 1580 have no logical switches assigned to the virtual fabric under consideration, although they may have logical switches assigned to other virtual fabrics. The techniques described herein can be used for all of the virtual fabrics defined in the network 1500.

A physical graph is created for the network 1500 shown in FIG. 15. The physical graph is then pruned as described above to eliminate edge nodes with no logical switches assigned to the virtual fabric. In a first pruning round, base switch B8 of chassis 1580 is pruned from the graph, but base switch B7 of chassis 1570 is left in the graph because it is not an edge node in the original graph. In a second pruning round, however, after the removal of base switch of chassis 1580, base switch of chassis 1570 has become an edge node and is pruned. After the second round, no more edge nodes of the graph exist without logical switches in the virtual fabric, so the pruning completes. Base switches B2 of chassis 1520 and B3 of chassis 1530 are not removed, because they are on a path of XISLs between pairs of base switches that have corresponding logical switches in the virtual fabric. The resulting physical graph is shown in FIG. 16.

Figure 16:
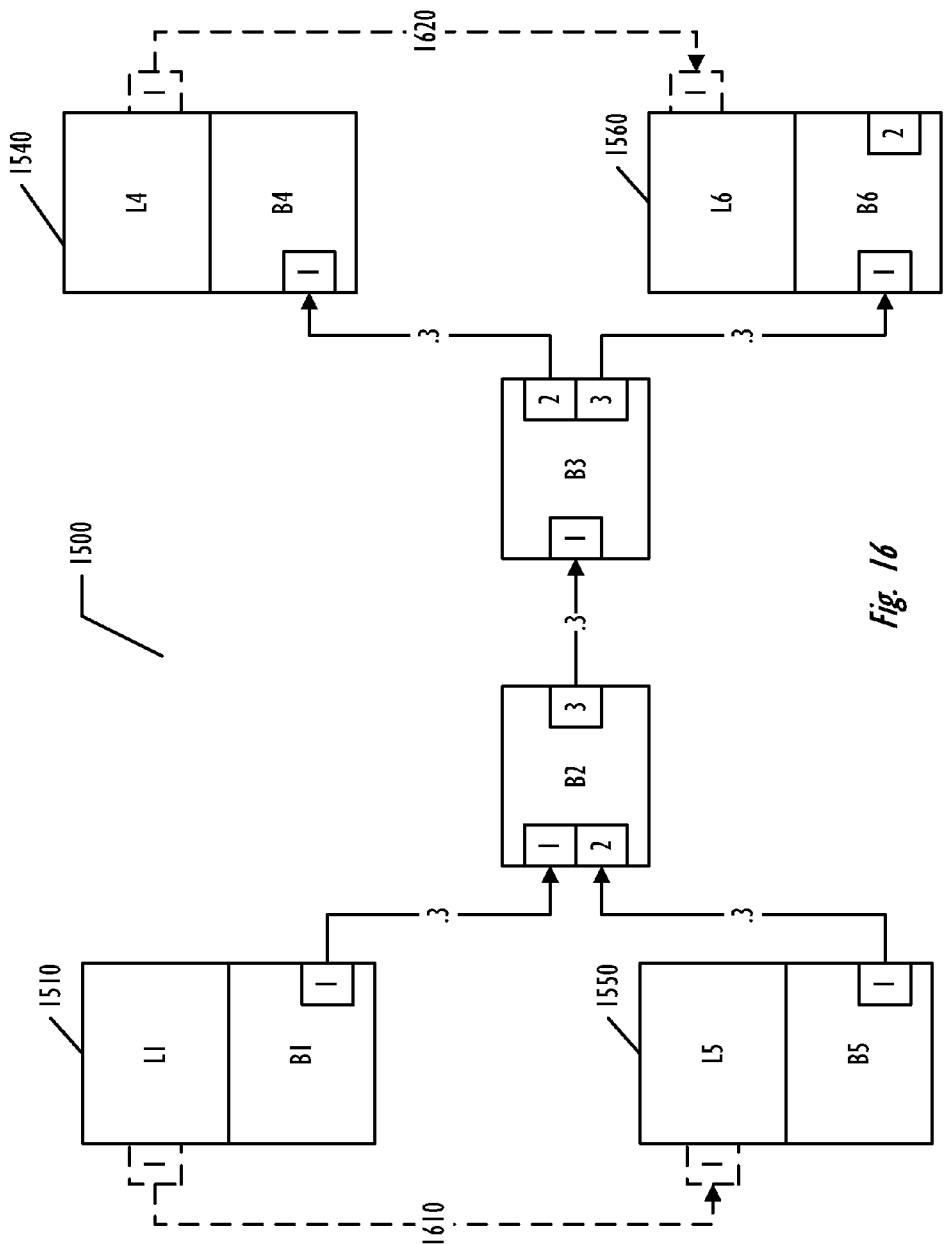
FIG. 16 is the block drawing of FIG. 15 after edge node pruning and after adding logical inter-switch links according to one embodiment.
Figure 17:
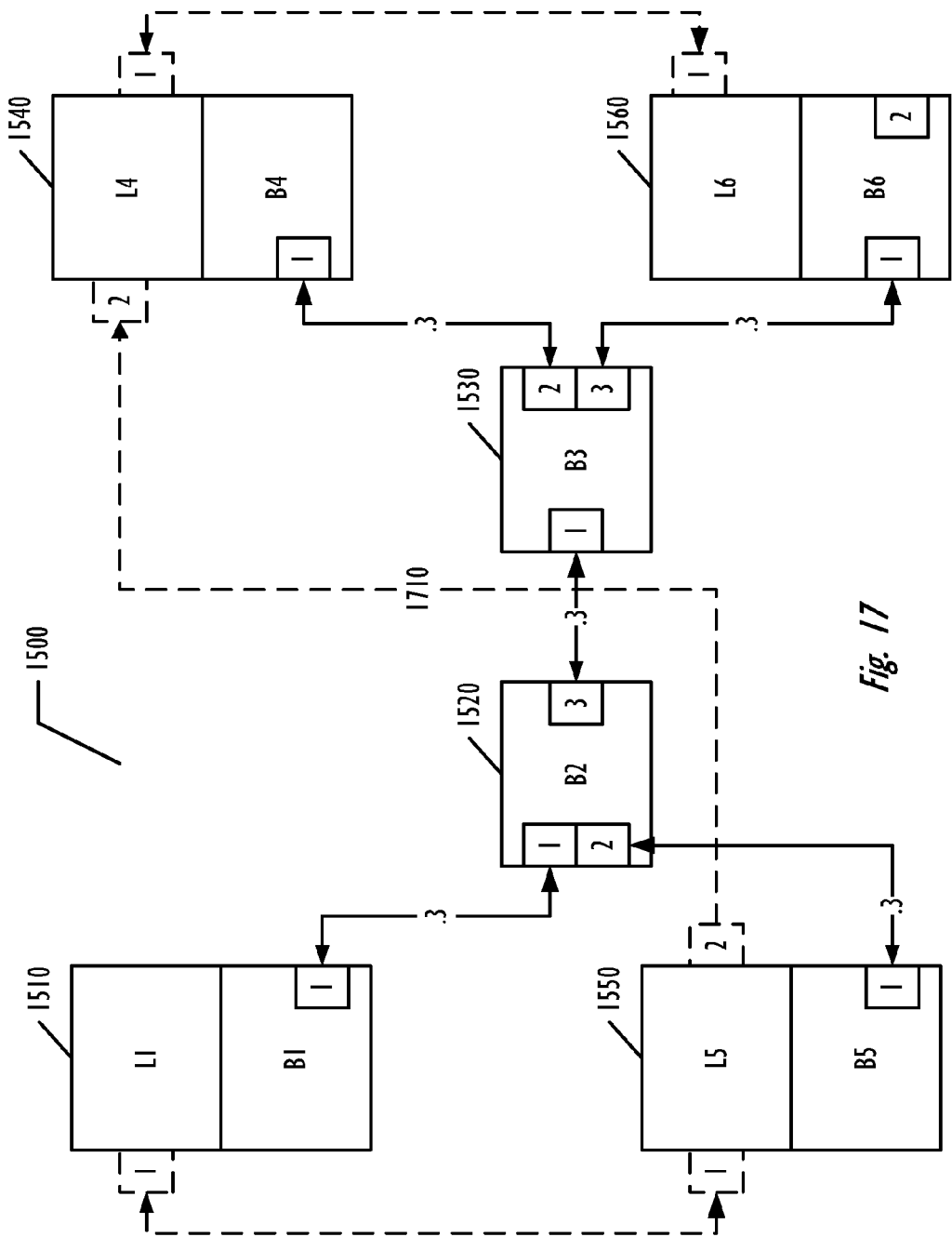
FIG. 17 is the block drawing of FIG. 16 with an additional logical inter-switch link to create a connected graph of logical switches according to one embodiment, illustrating example costs of the inter-switch links connecting base switches.

FIG. 16 also shows costs associated with the XISLs, in this example 0.3 for each XISL, and logical links 1610 (connecting logical switches L1 of chassis 1510 and L5 of chassis 1550) and 1620 (connecting logical switches L4 of chassis 1540 and L6 of chassis 1560) created as a result of the addition of logical links to match the physical graph as described above, and corresponding to the logical graph of FIG. 10. Because the logical graph is a disconnected graph, as described above an additional logical link is added to the graph to connect the two disconnected portions, resulting in the configuration shown in FIG. 17, which adds a link 1710 between logical port 2 of logical switch L5 of switch 1550 and logical port 2 of logical switch L4 of switch 1540, corresponding to the logical graph of FIG. 12.

Figure 18:
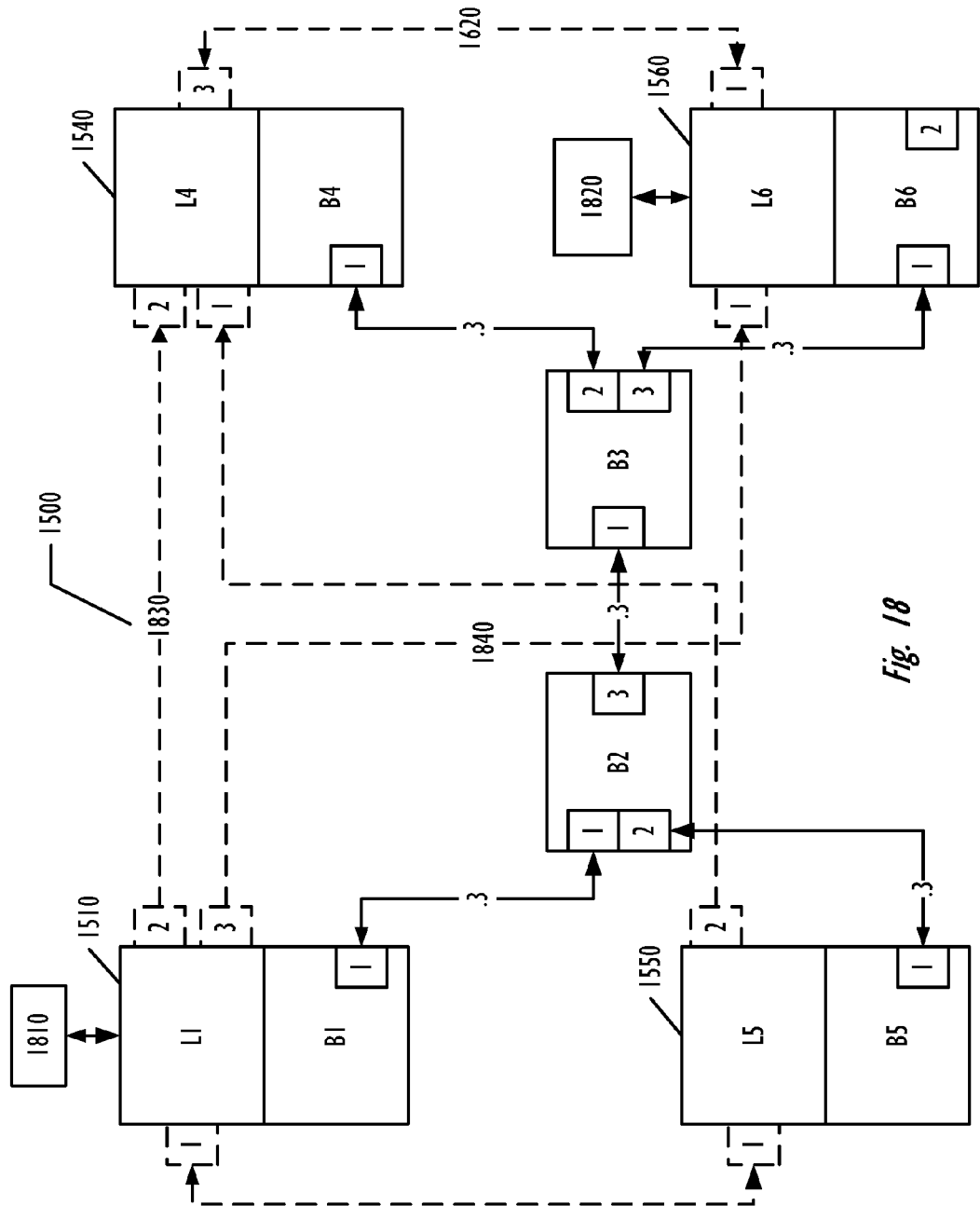
FIG. 18 is the block drawing of FIG. 17 with additional logical inter-switch links added according to the technique of FIG. 13.

Additional logical links 1830 and 1840 are then added to the network 1500 in FIG. 18, corresponding to the logical graph of FIG. 14, using a topology factor of 0.5 as described in detail above. The result is a collection of logical links connecting the logical switches L1-L6 with less than a full mesh of LISLs, but with more than the minimally connected network 1500 shown in FIG. 17. As described above, if a different topology factor were selected by the user or by a heuristic, then a different network 1500 would be configured, including, for example, a full mesh of LISLs (using a topology factor of 1) and the minimal mesh of FIG. 17 (using a topology factor of 0). Thus, by adjusting the topology factor, the topology of the resulting network can be modified to provide a desired relationship between robustness and scalability, while also attempting to make the logical links correspond to the underlying collection of XISLs physically connecting base switches for manageability purposes.

A host 1810 requesting data from storage system 1820 has multiple paths that can be used for the data traffic, so that if, for example, the LISL 1840 between port 3 of logical switch L1 of chassis 1510 and port 1 of logical switch L6 of chassis 1580 goes down, data can still flow between the host 1810 and the storage system 1820, albeit at a higher cost, by using other logical links, such as the logical link 1830 connecting logical switch L1 of chassis 1510 with logical switch L4 of chassis 1540, and the logical link 1620 connecting logical switch L4 of chassis 1540 and the logical switch L6 of chassis 1560, for example.

Although the logical topology dictated by the above technique may be ideal as an initial condition, when nodes are added or removed from the logical graph or the physical graph, the topology necessarily changes, and changes could result in a disruption of the topology. To reduce the frequency of disruptions, in one embodiment, any time a node is added to or removed from the virtual fabric, the steps of creating logical links to maintain the physical topology mapping and to maintain connectivity described above are repeated. Repeating these steps will result in a change of the topology only if the physical mapping changes or if the connectivity is broken, both of which are acceptable conditions for requiring a topology reconfiguration.

In one embodiment, the calculations described above are performed centrally, with the results distributed to the logical and physical switches covered by the topology, to provide a consistent mapping of logical switches to physical links between them.

The techniques described above provide a way to configure network switches that are partitioned into logical switches, with logical connections such as LISLs connecting the logical switches across physical connections, such as XISLs. The LISLs are defined according to three metrics: (1) the number of logical links in the topology; (2) the connectivity of the logical topology; and (3) the mapping of the logical topology to the physical topology. A topology factor is used to allow an operator of the network switch to vary the relative weight of the first two metrics as desired, resulting in a mesh of LISLs that can be anywhere between a full mesh and a minimally connected mesh of LISLs, trading off between scalability and robustness.

In one embodiment, the addition of additional links for increasing connectivity based on the topology factor is performed whenever the steps of creating logical links to maintain the physical topology mapping and to maintain connectivity describe above are repeated. Therefore, this optimization based on the topology factor is performed only when reconfiguring the topology is acceptable.

We claim:

1. A method of configuring a plurality of network switches, each partitionable into a base switch and at least one logical switch, the method comprising:
   assigning by a network switch some of the logical switches of the plurality of network switches to a virtual fabric of logical switches;
   creating by the network switch a first graph wherein nodes of the first graph represent the logical switches assigned to the virtual fabric;
   increasing by the network switch a connectivity of the first graph responsive to a predetermined topology factor; and
   creating by the network switch logical inter-switch links between logical switches assigned to the virtual fabric corresponding to edges in the first graph.

2. The method of claim 1, further comprising:
   creating by the network switch a second graph,
      wherein nodes of the second graph represent the base switches of the plurality of network switches, and
      wherein edges of the second graph represent physical inter-switch links between pairs of the base switches;
   pruning by the network switch an edge node of the second graph if a logical switch corresponding to the base switch represented by the edge node is not assigned to the virtual fabric; and
   wherein creating by the network switch a first connected graph comprises:
      connecting by the network switch each node of the first graph with as many edges as a degree of a node of the second graph representing a base switch corresponding to the logical switch represented by the node of the first graph.

3. The method of claim 1, wherein increasing the connectivity of the first graph responsive to a predetermined topology factor comprises:
   determining by the network switch a number of additional edges of the first graph that would make the first graph a completely connected graph if added; and
   adding by the network switch a portion of the number of additional edges responsive to the predetermined topology factor.

4. The method of claim 1, further comprising:
   adding by the network switch an edge from a first node of the first graph to a closest higher order node of the first graph not directly connected to the first node if no path from the first node to a higher order node already exists in the first graph with less than a predetermined number of hops.

5. The method of claim 4, wherein a second node is a higher order node than the first node if the logical switch represented by the second node has a higher world-wide name that the logical switch represented by the first node.

6. The method of claim 4, wherein a first pair of nodes is closer than a second pair of nodes in the first graph if a path between base switches corresponding to the logical switches represented by the first pair of nodes has a lower cost than a path between base switches corresponding to the logical switches represented by the second pair of nodes.

7. A switch chassis, partitionable into at least one logical switch and a corresponding base switch, comprising:
   a processor;
   a storage medium, connected to the processor;
   a software, stored on the storage medium, that when executed by the processor causes the processor to perform actions comprising:
      assigning logical switches of the switch chassis and other switch chassis to a virtual fabric of logical switches;
      creating a first graph wherein nodes of the first graph represent the logical switches assigned to the virtual fabric;
      increasing a connectivity of the first graph responsive to a predetermined topology factor; and
      creating logical inter-switch links between logical switches assigned to the virtual fabric corresponding to edges in the first graph.

8. The switch chassis of claim 7, further comprising:
   at least one inter-switch link connecting the base switch and base switches of other switch chassis,
   wherein creating the first graph comprises:
      initially creating edges of the first graph to correspond to inter-switch links between base switches corresponding to logical switches represented by nodes of the first graph wherein the software, when executed by the processor, causes the processor to perform actions further comprising:
creating a second graph,
wherein nodes of the second graph represent base switches, and
wherein edges of the second graph represent inter-switch links between pairs of the base switches, and
wherein any base switch not on a path of inter-switch links between base switches corresponding to logical switches assigned to the virtual fabric is excluded from the second graph; and
connecting a node of the first graph representing a logical switch with as many edges as there are edges in the second graph connected to a node representing the base switch.

9. The switch chassis of claim 7, wherein increasing the connectivity of the first graph responsive to a predetermined topology factor comprises:
determining by the topology factor how many to add of a number of additional edges of the first graph that would make the first graph a completely connected graph if added.

10. A non-transitory computer readable medium on which is stored software for managing a plurality of network switches, each partitionable into at least one logical switch and a corresponding base switch, the software for instructing processors of the plurality of network switches to perform actions comprising:
assigning the logical switches to a virtual fabric of logical switches;
creating a first graph and a second graph,
wherein nodes of the first graph represent the logical switches assigned to the virtual fabric,
wherein nodes of the second graph represent the base switches of the plurality of network switches, and
wherein edges of the second graph represent physical inter-switch links between pairs of the base switches;
connecting each node of the first graph with as many edges as a degree of a node of the second graph representing the base switch corresponding to the logical switch represented by the node of the first graph;
increasing a connectivity of the first graph responsive to a predetermined topology factor; and
creating logical inter-switch links between logical switches assigned to the virtual fabric corresponding to edges in the first graph.

11. The computer readable medium of claim 10, the software for instructing processors of the plurality of network switches to perform actions further comprising:
pruning an edge node of the second graph if a logical switch corresponding to the base switch represented by the edge node is not assigned to the virtual fabric.

12. The computer readable medium of claim 10, wherein increasing the connectivity of the first graph responsive to a predetermined topology factor comprises:
determining a number of additional edges of the first graph that would make the first graph a completely connected graph if added;
multiplying the number of additional edges by the topology factor producing a modified number of additional edges; and
adding the modified number of additional edges to the first graph.

13. The computer readable medium of claim 10, the software for instructing processors of the plurality of network switches to perform actions further comprising:
adding an edge from a first node of the first graph to a closest higher order node of the first graph not directly connected to the first node if no path from the first node to a higher order node already exists in the first graph with less than a predetermined number of hops.

14. The computer readable medium of claim 13, wherein a second node is a higher order node than the first node if the logical switch represented by the second node has a higher world-wide name that the logical switch represented by the first node.

15. The computer readable medium of claim 13, wherein a first pair of nodes is closer than a second pair of nodes in the first graph if a path between the base switches corresponding to the logical switches represented by the first pair of nodes has a lower cost than a path between base switches corresponding to the logical switches represented by the second pair of nodes.

16. A method of configuring a network of switches, each partitionable into at least one logical switch and a corresponding base switch, comprising:
assigning by a switch some of the logical switches of the plurality of network switches to a virtual fabric of logical switches;
creating by the switch a first graph,
wherein nodes of the first graph represent the base switches of the plurality of network switches, and
wherein edges of the first graph represent physical inter-switch links between pairs of the base switches;
pruning by the switch an edge node of the first graph if a logical switch corresponding to the base switch represented by the edge node is not assigned to the virtual fabric;
creating by the switch a second graph wherein nodes of the second graph represent the logical switches assigned to the virtual fabric;
connecting by the switch each node of the second graph with as many edges as a degree of a node of the first graph representing the base switch corresponding to the logical switch represented by the node of the second graph;
increasing by the switch a connectivity of the second graph responsive to a predetermined topology factor; and
creating by the switch logical inter-switch links between logical switches assigned to the virtual fabric corresponding to edges in the second graph.

17. The method of claim 16, wherein increasing by the switch the connectivity of the second graph responsive to a predetermined topology factor comprises:
determining by the switch a number of additional edges of the second graph that would make the second graph a completely connected graph if added; and
adding by the switch a portion of the number of additional edges responsive to the predetermined topology factor.

18. The method of claim 16, further comprising:
adding by the switch an edge from a first node of the second graph to a second node of the first graph not directly connected to the first node if no path from the first node to any higher order node already exists in the second graph with less than a predetermined number of hops.

19. The method of claim 18, wherein the second node represents a logical switch with a higher worldwide name that the logical switch represented by the first node.

20. The method of claim 18, wherein the second node has a lowest cost path between base switches corresponding to the logical switches represented by the first node and the second node.

21. The method of claim 16, further comprising:
repeating the steps of creating by the switch the first graph, creating by the switch the second graph, connecting by the switch each node of the second graph, increasing by the switch the connectivity of the second graph, and creating by the switch logical inter-switch links as logical switches and base switches are added or deleted.

22. A method of configuring a plurality of network switches, each partitionable into at least one logical switch, the method comprising:
assigning by a network switch some of the logical switches of the plurality of network switches to a first plurality of logical switches;
creating by the network switch a first graph wherein nodes of the first graph represent the logical switches assigned to the first plurality of logical switches;
increasing by the network switch a connectivity of the first graph responsive to a predetermined topology factor; and
creating by the network switch logical connections between logical switches assigned to the first plurality of logical switches corresponding to edges in the first graph.

23. The method of claim 22, further comprising:
creating by the network switch a second graph,
wherein each node of the second graph represents a physical switch of the plurality of network switches, and
wherein edges of the second graph represent physical connections between pairs of physical switches;
pruning by the network switch an edge node of the second graph if no logical switch corresponding to the physical switch represented by the edge node is assigned to the first plurality of logical switches; and
wherein creating by the network switch a first connected graph comprises:
connecting by the network switch each node of the first graph with as many edges as a degree of a node of the second graph representing a physical switch corresponding to the logical switch represented by the node of the first graph.

24. The method of claim 22, wherein increasing by the network switch the connectivity of the first graph responsive to a predetermined topology factor comprises:
determining by the network switch a number of additional edges of the first graph that would make the first graph a completely connected graph if added; and
adding by the network switch a portion of the number of additional edges responsive to the predetermined topology factor.

25. The method of claim 22, further comprising:
adding by the network switch an edge from a first node of the first graph to a closest higher order node of the first graph not directly connected to the first node if no path from the first node to a higher order node already exists in the first graph with less than a predetermined number of hops.

26. The method of claim 25, wherein a second node is a higher order node than the first node if the logical switch represented by the second node has a higher world-wide name that the logical switch represented by the first node.

27. The method of claim 25, wherein a first pair of nodes is closer than a second pair of nodes in the first graph if a path between physical switches corresponding to logical switches represented by the first pair of nodes has a lower cost than a path between physical switches corresponding to logical switches represented by the second pair of nodes.

* * * * *